United States Patent
Liu et al.

(10) Patent No.: US 11,438,875 B2
(45) Date of Patent: Sep. 6, 2022

(54) SIGNALING RECEIVING METHOD AND RELATED DEVICE

(71) Applicant: Huawei Technologies Co., Ltd., Shenzhen (CN)

(72) Inventors: Xianda Liu, Beijing (CN); Kunpeng Liu, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 345 days.

(21) Appl. No.: 16/716,244

(22) Filed: Dec. 16, 2019

(65) Prior Publication Data
US 2020/0120640 A1    Apr. 16, 2020

Related U.S. Application Data

(63) Continuation of application No. PCT/CN2018/089823, filed on Jun. 4, 2018.

(30) Foreign Application Priority Data

Jun. 16, 2017 (CN) .......................... 201710459691.5

(51) Int. Cl.
*H04W 72/02* (2009.01)
*H04B 7/0456* (2017.01)
(Continued)

(52) U.S. Cl.
CPC .......... *H04W 72/02* (2013.01); *H04B 7/0456* (2013.01); *H04L 5/0041* (2013.01);
(Continued)

(58) Field of Classification Search
CPC ............... H04W 72/02; H04W 72/042; H04W 72/0453; H04W 80/08; H04W 72/044;
(Continued)

(56) References Cited

U.S. PATENT DOCUMENTS

2012/0275413 A1    11/2012  Hong et al.
2013/0121276 A1*    5/2013  Kim .......................... H04L 1/00
                                                              370/329
(Continued)

FOREIGN PATENT DOCUMENTS

CN    102438312 A    5/2012
CN    102726016 A    10/2012
(Continued)

OTHER PUBLICATIONS

"Introduce V2X in TS 36.331," 3GPP TSG-RAN WG2 Meeting #97, R2-1701363, Athens, Greece, total 45 pages, 3rd Generation Partnership Project, Valbonne, France (Feb. 13-17, 2016).

*Primary Examiner* — Omar J Ghowrwal
(74) *Attorney, Agent, or Firm* — Leydig, Voit & Mayer, Ltd.

(57) ABSTRACT

Embodiments of the present invention disclose a signaling receiving method and a related device. The method includes: determining, by a terminal based on resource unit allocation signaling, locations of S resource units in a system bandwidth that are scheduled to the terminal; grouping, by the terminal, the S resource units into K resource groups, where a quantity of resource units that separate any resource unit in a first resource group from any resource unit in a second resource group in the system bandwidth is not less than a threshold M; and precoding, by the terminal by using N precoding matrices, data sent in N resource unit sets, where resource units included in each of the N resource unit sets are determined based on the K resource groups, and S, K, and M are all positive integers.

17 Claims, 9 Drawing Sheets

(51) Int. Cl.
*H04W 72/04* (2009.01)
*H04W 80/08* (2009.01)
*H04L 5/00* (2006.01)

(52) U.S. Cl.
CPC ......... *H04L 5/0094* (2013.01); *H04W 72/042* (2013.01); *H04W 72/044* (2013.01); *H04W 72/0453* (2013.01); *H04W 80/08* (2013.01); *H04L 5/0007* (2013.01)

(58) Field of Classification Search
CPC ... H04B 7/0456; H04L 5/0007; H04L 5/0041; H04L 5/0094
See application file for complete search history.

(56) References Cited

U.S. PATENT DOCUMENTS

| | | |
|---|---|---|
| 2013/0121278 A1 | 5/2013 | Noh et al. |
| 2013/0182673 A1 | 7/2013 | Takeda et al. |
| 2016/0269160 A1 | 9/2016 | Noh et al. |
| 2016/0301511 A1 | 10/2016 | Yoon et al. |

FOREIGN PATENT DOCUMENTS

| | | |
|---|---|---|
| CN | 103109471 A | 5/2013 |
| CN | 103248468 A | 8/2013 |
| CN | 103944692 A | 7/2014 |
| CN | 104685821 A | 6/2015 |
| CN | 104995856 A | 10/2015 |
| WO | 2016079905 A1 | 5/2016 |

\* cited by examiner

SIGNALING RECEIVING METHOD AND RELATED DEVICE

CROSS-REFERENCE TO RELATED APPLICATIONS

This application is continuation application of International application No. PCT/CN2018/089823, filed on Jun. 4, 2018, which claims priority to Chinese Patent Application No. 201710459691.5, filed on Jun. 16, 2017. The disclosures of the aforementioned applications are hereby incorporated by reference in their entireties.

TECHNICAL FIELD

The present disclosure relates to the field of communications technologies, and in particular, to a signaling receiving method and a related device.

BACKGROUND

During LTE downlink transmission, a protocol supports UE in measuring and report channel state information (CSI). The CSI includes a rank indicator (RI), a precoding matrix indicator (PMI), and a channel quality indicator (CQI). The RI is used to indicate a quantity of layer(s) used for data transmission. The PMI is used to indicate a precoding matrix used for physical downlink shared channel (PDSCH) transmission, to support a base station to use a space division multiplexing sending mode. The CQI is used to indicate a quantization result of channel quality state information. PMI reporting may be classified into two manners: wideband PMI reporting and subband PMI reporting. When the wideband PMI reporting is configured for the UE, the terminal device reports one PMI. The one PMI is used to indicate a precoding matrix of an entire system bandwidth. When the subband PMI reporting is configured for the UE, the UE reports a plurality of PMIs. Each of the plurality of PMIs is used to indicate precoding used for sending data at one of a plurality of subbands, and different PMIs may be reported for different subbands. The terminal device may consider that a fixed precoding matrix is used for each RB in a precoding resource block group (PRG). In other words, a precoding matrix at a frequency band corresponding to the PRG does not vary with a frequency. The PRG is a subband in a system bandwidth. Because a quantity of PMIs is restricted due to limited overheads of signaling carried on a downlink control channel (PDSCH), how to use a limited quantity of PMIs to indicate a relatively large system bandwidth is a problem to be resolved in the present disclosure.

SUMMARY

Embodiments of the present disclosure provide a signaling receiving method and a related device, which properly use a limited quantity of PMIs to indicate a precoding matrix used for sending data at a relatively large system bandwidth.

According to a first aspect, an embodiment of the present disclosure provides a signaling receiving method. The method includes: determining, by a terminal based on resource unit allocation signaling, locations of S resource units in a system bandwidth that are scheduled to the terminal; grouping, by the terminal, the S resource units into K resource groups, where a quantity of resource units that separate any resource unit in a first resource group from any resource unit in a second resource group in the system bandwidth is not less than a threshold M, the first resource group and the second resource group are any two of the K resource groups, a quantity of resource units that separate a first resource unit from a second resource unit in the system bandwidth is less than the threshold M, the first resource unit and the second resource unit are two resource units in any one of the K resource groups, and in the system bandwidth, the first resource unit is a resource unit that is scheduled to the terminal preceding or following the second resource unit; and precoding, by the terminal by using N precoding matrices, data sent in N resource unit sets, where resource units included in each of the N resource unit sets are determined based on the K resource groups, S, K, and M are all positive integers, and all resource units included in the N resource unit sets are the same as the S resource units.

According to the foregoing steps, when the data sent in the S scheduled resource units needs to be precoded, first, the S resource units are grouped into the K resource groups based on intervals between the S resource units, so that resource units with a relatively large interval are grouped into different resource groups, and resource units with a relatively small interval are grouped into a same group. Then, a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio and improve encoding and decoding performance of a precoded data signal on a receive side. In addition, a precoding matrix used for sending data at a relatively large system bandwidth can be indicated by properly using a limited quantity of PMIs, and a relatively large system bandwidth can be indicated by using the limited quantity of PMIs.

With reference to the first aspect, in a first possible implementation of the first aspect, each of the N resource unit sets belongs to a first-type resource unit set or a second-type resource unit set, resource units included in any resource unit set belonging to the first-type resource unit set are the same as resource units included in at least one of the K resource groups, and resource units included in a plurality of resource unit sets in the second-type resource unit set belong to a same resource group of the K resource groups.

With reference to any one of the first aspect or the first possible implementation of the first aspect, in a second possible implementation of the first aspect, when a value of K is not greater than a value of N and K is greater than 1, each of the K resource groups includes at least one of the N resource unit sets and different resource groups correspond to different resource unit sets; if a quantity of resource units included in a third resource group is greater than or equal to a quantity of resource units included in a fourth resource group, a quantity of resource unit sets included in the third resource group is not less than a quantity of resource unit sets included in the fourth resource group; and the third resource group and the fourth resource group are any two of the K resource groups.

With reference to any one of the first aspect or the possible implementations of the first aspect, in a third possible implementation of the first aspect, before the precoding, by the terminal by using N precoding matrices, data sent in N resource unit sets, the method further includes: dividing a target resource group into j resource unit subsets, where the target resource group is a resource group whose quantity j of included resource unit sets is greater than or equal to 2 in the K resource groups, and each of j resource unit sets included in the target resource group is the same as each of the j resource unit subsets respectively.

With reference to any one of the first aspect or the possible implementations of the first aspect, in a fourth possible implementation of the first aspect, when the value of K is 1, before the precoding, by the terminal by using N precoding matrices, data sent in N resource unit sets, the method further includes: grouping the K resource groups into N resource unit subsets, where each of the N resource unit sets is the same as each of the N resource unit subsets respectively.

With reference to any one of the first aspect or the possible implementations of the first aspect, in a fifth possible implementation of the first aspect, when the value of K is greater than the value of N, each of the N resource unit sets includes at least one of the K resource groups and different resource unit sets include different resource groups.

With reference to any one of the first aspect or the possible implementations of the first aspect, in a sixth possible implementation of the first aspect, the threshold M is preconfigured in the terminal or is obtained by the terminal based on indication information, and the indication information is carried in higher layer signaling or downlink control information DCI.

According to a second aspect, an embodiment of the present disclosure provides a signaling indication method. The method includes: grouping, by the network device, S scheduled resource units into K resource groups, where a quantity of resource units that separate any resource unit in a first resource group from any resource unit in a second resource group in the system bandwidth is not less than a threshold M, the first resource group and the second resource group are any two of the K resource groups, a quantity of resource units that separate a first resource unit from a second resource unit in the system bandwidth is less than the threshold M, the first resource unit and the second resource unit are two resource units in any one of the K resource groups, and in the system bandwidth, the first resource unit is a resource unit that is scheduled to the terminal preceding or following the second resource unit; sending, by the network device, resource unit allocation signaling, where the resource unit allocation signaling is used to indicate the S scheduled resource units; and sending, by the network device, precoding indication information, where the precoding indication information is used to indicate N precoding matrices that are used for sending data in N resource unit sets, resource units included in each of the N resource unit sets are determined based on the K resource groups, S, K, M, and N are all positive integers, and all resource units included in the N resource unit sets are the same as the S resource units.

According to the foregoing steps, when the data sent in the S scheduled resource units needs to be precoded, first, the S resource units are grouped into the K resource groups based on intervals between the S resource units, so that resource units with a relatively large interval are grouped into different resource groups, and resource units with a relatively small interval are grouped into a same group. Then, a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio and improve encoding and decoding performance of a precoded data signal on a receive side. In addition, a precoding matrix used for sending data at a relatively large system bandwidth can be indicated by properly using a limited quantity of PMIs, and a relatively large system bandwidth can be indicated by using the limited quantity of PMIs.

With reference to the second aspect, in a first possible implementation of the second aspect, each of the N resource unit sets belongs to a first-type resource unit set or a second-type resource unit set, resource units included in any resource unit set belonging to the first-type resource unit set are the same as resource units included in at least one of the K resource groups, and resource units included in a plurality of resource unit sets in the second-type resource unit set belong to a same resource group of the K resource groups.

With reference to any one of the second aspect or the first possible implementation of the second aspect, in a second possible implementation of the second aspect, when a value of K is not greater than a value of N and K is greater than 1, each of the K resource groups includes at least one of the N resource unit sets and different resource groups correspond to different resource unit sets; if a quantity of resource units included in a third resource group is greater than or equal to a quantity of resource units included in a fourth resource group, a quantity of resource unit sets included in the third resource group is not less than a quantity of resource unit sets included in the fourth resource group; and the third resource group and the fourth resource group are any two of the K resource groups.

With reference to any one of the second aspect or the possible implementations of the second aspect, in a third possible implementation of the second aspect, the method further includes: dividing a target resource group into j resource unit subsets, where the target resource group is a resource group whose quantity j of included resource unit sets is greater than or equal to 2 in the K resource groups, and each of j resource unit sets included in the target resource group is the same as each of the j resource unit subsets respectively.

With reference to any one of the second aspect or the possible implementations of the second aspect, in a fourth possible implementation of the second aspect, when the value of K is 1, the method further includes: grouping the K resource groups into N resource unit subsets, where each of the N resource unit sets is the same as each of the N resource unit subsets respectively.

With reference to any one of the second aspect or the possible implementations of the second aspect, in a fifth possible implementation of the second aspect, when the value of K is greater than the value of N, each of the N resource unit sets includes at least one of the K resource groups and different resource unit sets include different resource groups.

With reference to any one of the second aspect or the possible implementations of the second aspect, in a sixth possible implementation of the second aspect, the threshold M is preconfigured in the terminal or is obtained by the terminal based on indication information, and the indication information is carried in higher layer signaling or downlink control information DCI.

According to a third aspect, an embodiment of the present disclosure provides a terminal. The terminal includes a processor and a memory, the memory is configured to store a program, and the processor invokes the program in the memory to perform the following operations: determining, based on resource unit allocation signaling, locations of S resource units in a system bandwidth that are scheduled to the terminal; grouping the S resource units into K resource groups, where a quantity of resource units that separate any resource unit in a first resource group from any resource unit in a second resource group in the system bandwidth is not less than a threshold M, the first resource group and the second resource group are any two of the K resource groups, a quantity of resource units that separate a first resource unit from a second resource unit in the system bandwidth is less than the threshold M, the first resource unit and the second resource unit are two resource units in any one of the K resource groups, and in the system bandwidth, the first resource unit is a resource unit that is scheduled to the terminal preceding or following the second resource unit; and precoding, by using N precoding matrices, data sent in N resource unit sets, where resource units included in each of the N resource unit sets are determined based on the K resource groups, S, K, and M are all positive integers, and all resource units included in the N resource unit sets are the same as the S resource units.

According to the foregoing operations, when the data sent in the S scheduled resource units needs to be precoded, first, the S resource units are grouped into the K resource groups based on intervals between the S resource units, so that resource units with a relatively large interval are grouped into different resource groups, and resource units with a relatively small interval are grouped into a same group. Then, a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio and improve encoding and decoding performance of a precoded data signal on a receive side. In addition, a precoding matrix used for sending data at a relatively large system bandwidth can be indicated by properly using a limited quantity of PMIs, and a relatively large system bandwidth can be indicated by using the limited quantity of PMIs.

With reference to the third aspect, in a first possible implementation of the third aspect, each of the N resource unit sets belongs to a first-type resource unit set or a second-type resource unit set, resource units included in any resource unit set belonging to the first-type resource unit set are the same as resource units included in at least one of the K resource groups, and resource units included in a plurality of resource unit sets in the second-type resource unit set belong to a same resource group of the K resource groups.

With reference to any one of the third aspect or the first possible implementation of the third aspect, in a second possible implementation of the third aspect, when a value of K is not greater than a value of N and K is greater than 1, each of the K resource groups includes at least one of the N resource unit sets and different resource groups correspond to different resource unit sets; if a quantity of resource units included in a third resource group is greater than or equal to a quantity of resource units included in a fourth resource group, a quantity of resource unit sets included in the third resource group is not less than a quantity of resource unit sets included in the fourth resource group; and the third resource group and the fourth resource group are any two of the K resource groups.

With reference to any one of the third aspect or the possible implementations of the third aspect, in a third possible implementation of the third aspect, before precoding, by using the N precoding matrices, the data sent in the N resource unit sets, the processor is further configured to divide a target resource group into j resource unit subsets, where the target resource group is a resource group whose quantity j of included resource unit sets is greater than or equal to 2 in the K resource groups, and each of j resource unit sets included in the target resource group is the same as each of the j resource unit subsets respectively.

With reference to any one of the third aspect or the possible implementations of the third aspect, in a fourth possible implementation of the third aspect, when the value of K is 1, before precoding, by using the N precoding matrices, the data sent in the N resource unit sets, the processor is further configured to group the K resource groups into N resource unit subsets, where each of the N resource unit sets is the same as each of the N resource unit subsets respectively.

With reference to any one of the third aspect or the possible implementations of the third aspect, in a fifth possible implementation of the third aspect, when the value of K is greater than the value of N, each of the N resource unit sets includes at least one of the K resource groups and different resource unit sets include different resource groups.

With reference to any one of the third aspect or the possible implementations of the third aspect, in a sixth possible implementation of the third aspect, the threshold M is preconfigured in the terminal or is obtained by the terminal based on indication information, and the indication information is carried in higher layer signaling or downlink control information DCI.

According to a fourth aspect, an embodiment of the present disclosure provides a network device. The network device includes a processor, a memory, and a transceiver, the memory is configured to store an instruction, and the processor invokes a program in the memory to perform the following operations: grouping S scheduled resource units into K resource groups, where a quantity of resource units that separate any resource unit in a first resource group from any resource unit in a second resource group in the system bandwidth is not less than a threshold M, the first resource group and the second resource group are any two of the K resource groups, a quantity of resource units that separate a first resource unit from a second resource unit in the system bandwidth is less than the threshold M, the first resource unit and the second resource unit are two resource units in any one of the K resource groups, and in the system bandwidth, the first resource unit is a resource unit that is scheduled to the terminal preceding or following the second resource unit; sending resource unit allocation signaling by using the transceiver, where the resource unit allocation signaling is used to indicate the S scheduled resource units; and sending precoding indication information by using the transceiver, where the precoding indication information is used to indicate N precoding matrices that are used for sending data in N resource unit sets, resource units included in each of the N resource unit sets are determined based on the K resource groups, S, K, M, and N are all positive integers, and all resource units included in the N resource unit sets are the same as the S resource units.

According to the foregoing operations, when the data sent in the S scheduled resource units needs to be precoded, first, the S resource units are grouped into the K resource groups based on intervals between the S resource units, so that resource units with a relatively large interval are grouped into different resource groups, and resource units with a relatively small interval are grouped into a same group.

Then, a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio and improve encoding and decoding performance of a precoded data signal on a receive side. In addition, a precoding matrix used for sending data at a relatively large system bandwidth can be indicated by properly using a limited quantity of PMIs, and a relatively large system bandwidth can be indicated by using the limited quantity of PMIs.

With reference to the fourth aspect, in a first possible implementation of the fourth aspect, each of the N resource unit sets belongs to a first-type resource unit set or a second-type resource unit set, resource units included in any resource unit set belonging to the first-type resource unit set are the same as resource units included in at least one of the K resource groups, and resource units included in a plurality of resource unit sets in the second-type resource unit set belong to a same resource group of the K resource groups.

With reference to any one of the fourth aspect or the first possible implementation of the fourth aspect, in a second possible implementation of the fourth aspect, when a value of K is not greater than a value of N and K is greater than 1, each of the K resource groups includes at least one of the N resource unit sets and different resource groups correspond to different resource unit sets; if a quantity of resource units included in a third resource group is greater than or equal to a quantity of resource units included in a fourth resource group, a quantity of resource unit sets included in the third resource group is not less than a quantity of resource unit sets included in the fourth resource group; and the third resource group and the fourth resource group are any two of the K resource groups.

With reference to any one of the fourth aspect or the possible implementations of the fourth aspect, in a third possible implementation of the fourth aspect, the processor is further configured to divide a target resource group into j resource unit subsets, where the target resource group is a resource group whose quantity j of included resource unit sets is greater than or equal to 2 in the K resource groups, and each of j resource unit sets included in the target resource group is the same as each of the j resource unit subsets respectively.

With reference to any one of the fourth aspect or the possible implementations of the fourth aspect, in a fourth possible implementation of the fourth aspect, when the value of K is 1, the processor is further configured to group the K resource groups into N resource unit subsets, where each of the N resource unit sets is the same as each of the N resource unit subsets respectively.

With reference to any one of the fourth aspect or the possible implementations of the fourth aspect, in a fifth possible implementation of the fourth aspect, when the value of K is greater than the value of N, each of the N resource unit sets includes at least one of the K resource groups and different resource unit sets include different resource groups.

With reference to any one of the fourth aspect or the possible implementations of the fourth aspect, in a sixth possible implementation of the fourth aspect, the threshold M is preconfigured in the terminal or is obtained by the terminal based on indication information, and the indication information is carried in higher layer signaling or downlink control information DCI.

According to a fifth aspect, an embodiment of the present disclosure provides a terminal. The terminal includes a determining unit, a grouping unit, and an encoding unit. The determining unit is configured to determine, based on resource unit allocation signaling, locations of S resource units in a system bandwidth that are scheduled to the terminal. The grouping unit is configured to group the S resource units into K resource groups, where a quantity of resource units that separate any resource unit in a first resource group from any resource unit in a second resource group in the system bandwidth is not less than a threshold M, the first resource group and the second resource group are any two of the K resource groups, a quantity of resource units that separate a first resource unit from a second resource unit in the system bandwidth is less than the threshold M, the first resource unit and the second resource unit are two resource units in any one of the K resource groups, and in the system bandwidth, the first resource unit is a resource unit that is scheduled to the terminal preceding or following the second resource unit. The encoding unit is configured to precode, by using N precoding matrices, data sent in N resource unit sets, where resource units included in each of the N resource unit sets are determined based on the K resource groups, S, K, and M are all positive integers, and all resource units included in the N resource unit sets are the same as the S resource units.

According to the foregoing steps, when the data sent in the S scheduled resource units needs to be precoded, first, the S resource units are grouped into the K resource groups based on intervals between the S resource units, so that resource units with a relatively large interval are grouped into different resource groups, and resource units with a relatively small interval are grouped into a same group. Then, a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio and improve encoding and decoding performance of a precoded data signal on a receive side. In addition, a precoding matrix used for sending data at a relatively large system bandwidth can be indicated by properly using a limited quantity of PMIs, and a relatively large system bandwidth can be indicated by using the limited quantity of PMIs.

With reference to the fifth aspect, in a first possible implementation of the fifth aspect, each of the N resource unit sets belongs to a first-type resource unit set or a second-type resource unit set, resource units included in any resource unit set belonging to the first-type resource unit set are the same as resource units included in at least one of the K resource groups, and resource units included in a plurality of resource unit sets in the second-type resource unit set belong to a same resource group of the K resource groups.

With reference to any one of the fifth aspect or the first possible implementation of the fifth aspect, in a second possible implementation of the fifth aspect, when a value of K is not greater than a value of N and K is greater than 1, each of the K resource groups includes at least one of the N resource unit sets and different resource groups correspond to different resource unit sets; if a quantity of resource units included in a third resource group is greater than or equal to a quantity of resource units included in a fourth resource group, a quantity of resource unit sets included in the third resource group is not less than a quantity of resource unit sets included in the fourth resource group; and the third resource group and the fourth resource group are any two of the K resource groups.

With reference to any one of the fifth aspect or the possible implementations of the fifth aspect, in a third possible implementation of the fifth aspect, the terminal further includes the grouping unit. Before the encoding unit precodes, by using the N precoding matrices, the data sent in the N resource unit sets, the grouping unit is further configured to divide a target resource group into j resource unit subsets, where the target resource group is a resource group whose quantity j of included resource unit sets is greater than or equal to 2 in the K resource groups, and each of j resource unit sets included in the target resource group is the same as each of the j resource unit subsets respectively.

With reference to any one of the fifth aspect or the possible implementations of the fifth aspect, in a fourth possible implementation of the fifth aspect, when the value of K is 1, before the encoding unit precodes, by using the N precoding matrices, the data sent in the N resource unit sets, the grouping unit is configured to group the K resource groups into N resource unit subsets, where each of the N resource unit sets is the same as each of the N resource unit subsets respectively.

With reference to any one of the fifth aspect or the possible implementations of the fifth aspect, in a fifth possible implementation of the fifth aspect, when the value of K is greater than the value of N, each of the N resource unit sets includes at least one of the K resource groups and different resource unit sets include different resource groups.

With reference to any one of the fifth aspect or the possible implementations of the fifth aspect, in a sixth possible implementation of the fifth aspect, the threshold M is preconfigured in the terminal or is obtained by the terminal based on indication information, and the indication information is carried in higher layer signaling or downlink control information DCI.

According to a sixth aspect, an embodiment of the present disclosure provides a network device, and the network device includes a grouping unit and a transceiver unit.

The grouping unit is configured to group S scheduled resource units into K resource groups, where a quantity of resource units that separate any resource unit in a first resource group from any resource unit in a second resource group in the system bandwidth is not less than a threshold M, the first resource group and the second resource group are any two of the K resource groups, a quantity of resource units that separate a first resource unit from a second resource unit in the system bandwidth is less than the threshold M, the first resource unit and the second resource unit are two resource units in any one of the K resource groups, and in the system bandwidth, the first resource unit is a resource unit that is scheduled to the terminal preceding or following the second resource unit. The transceiver unit is configured to send resource unit allocation signaling, where the resource unit allocation signaling is used to indicate the S scheduled resource units. The transceiver unit is further configured to send precoding indication information, where the precoding indication information is used to indicate N precoding matrices that are used for sending data in N resource unit sets, resource units included in each of the N resource unit sets are determined based on the K resource groups, S, K, M, and N are all positive integers, and all resource units included in the N resource unit sets are the same as the S resource units.

According to the foregoing steps, when the data sent in the S scheduled resource units needs to be precoded, first, the S resource units are grouped into the K resource groups based on intervals between the S resource units, so that resource units with a relatively large interval are grouped into different resource groups, and resource units with a relatively small interval are grouped into a same group. Then, a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio and improve encoding and decoding performance of a precoded data signal on a receive side. In addition, a precoding matrix used for sending data at a relatively large system bandwidth can be indicated by properly using a limited quantity of PMIs, and a relatively large system bandwidth can be indicated by using the limited quantity of PMIs.

With reference to the sixth aspect, in a first possible implementation of the sixth aspect, each of the N resource unit sets belongs to a first-type resource unit set or a second-type resource unit set, resource units included in any resource unit set belonging to the first-type resource unit set are the same as resource units included in at least one of the K resource groups, and resource units included in a plurality of resource unit sets in the second-type resource unit set belong to a same resource group of the K resource groups.

With reference to any one of the sixth aspect or the first possible implementation of the sixth aspect, in a second possible implementation of the sixth aspect, when a value of K is not greater than a value of N and K is greater than 1, each of the K resource groups includes at least one of the N resource unit sets and different resource groups correspond to different resource unit sets; if a quantity of resource units included in a third resource group is greater than or equal to a quantity of resource units included in a fourth resource group, a quantity of resource unit sets included in the third resource group is not less than a quantity of resource unit sets included in the fourth resource group; and the third resource group and the fourth resource group are any two of the K resource groups.

With reference to any one of the sixth aspect or the possible implementations of the sixth aspect, in a third possible implementation of the sixth aspect, the grouping unit is further configured to divide a target resource group into j resource unit subsets, where the target resource group is a resource group whose quantity j of included resource unit sets is greater than or equal to 2 in the K resource groups, and each of j resource unit sets included in the target resource group is the same as each of the j resource unit subsets respectively.

With reference to any one of the sixth aspect or the possible implementations of the sixth aspect, in a fourth possible implementation of the sixth aspect, when the value of K is 1, the grouping unit is further configured to group the K resource groups into N resource unit subsets, where each of the N resource unit sets is the same as each of the N resource unit subsets respectively.

With reference to any one of the sixth aspect or the possible implementations of the sixth aspect, in a fifth possible implementation of the sixth aspect, when the value of K is greater than the value of N, each of the N resource unit sets includes at least one of the K resource groups and different resource unit sets include different resource groups.

With reference to any one of the sixth aspect or the possible implementations of the sixth aspect, in a sixth possible implementation of the sixth aspect, the threshold M is preconfigured in the terminal or is obtained by the terminal based on indication information, and the indication information is carried in higher layer signaling or downlink control information DCI.

According to a seventh aspect, an embodiment of the present disclosure provides a storage medium. The storage medium is configured to store an instruction, and when the instruction is run on a processor of a terminal, the terminal performs the method according to any one of the first aspect or the possible implementations of the first aspect, or when the instruction is run on a processor of a network device, the network device performs the method according to any one of the second aspect or the possible implementations of the second aspect.

According to an eighth aspect, an embodiment of the present disclosure provides a computer program product including an instruction. When the computer program product is run on a computer, the computer is enabled to perform the method according to any one of the first aspect or the possible implementations of the first aspect, or the method according to any one of the second aspect or the possible implementations of the second aspect.

According to the embodiments of the present disclosure, when the data sent in the S scheduled resource units needs to be precoded, first, the S resource units are grouped into the K resource groups based on intervals between the S resource units, so that resource units with a relatively large interval are grouped into different resource groups, and resource units with a relatively small interval are grouped into a same group. Then, a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio and improve encoding and decoding performance of a precoded data signal on a receive side. In addition, a precoding matrix used for sending data at a relatively large system bandwidth can be indicated by properly using a limited quantity of PMIs, and a relatively large system bandwidth can be indicated by using the limited quantity of PMIs.

BRIEF DESCRIPTION OF DRAWINGS

To describe the technical solutions in the embodiments of the present disclosure more clearly, the following briefly describes the accompanying drawings required for describing the embodiments of the present disclosure or the background.

DESCRIPTION OF EMBODIMENTS

The following describes the embodiments of the present disclosure with reference to the accompanying drawings in the embodiments of the present disclosure.

Figure 1:
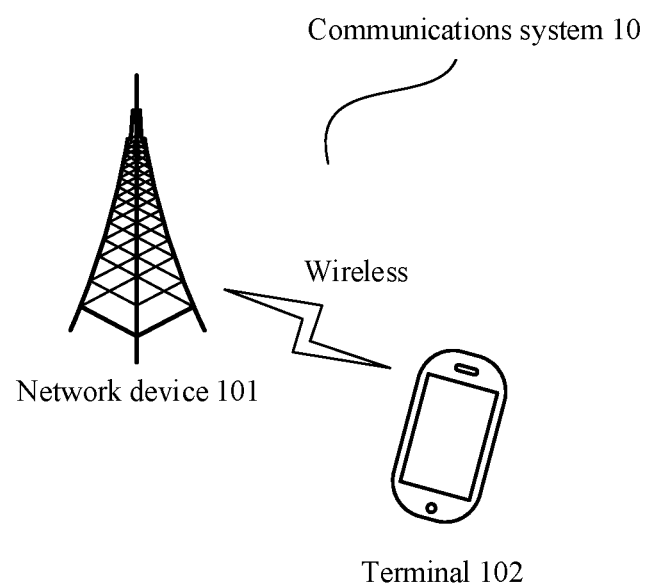
FIG. 1 is a schematic structural diagram of a communications system according to an embodiment of the present disclosure.

FIG. 1 is a schematic structural diagram of a communications system 10 according to an embodiment of the present disclosure. The communications system 10 includes a network device 101 and a terminal 102. The communications system 10 may be a communications system using a communications technology such as a second generation mobile communications technology (2G), a third generation mobile communications technology (3G), a long term evolution (LTE) technology, a fourth generation mobile communications technology (4G), a fifth generation mobile communications technology (5G), another existing communications technology, or a subsequently studied communications technology. The network device 101 is a radio access node in the communications system. For example, the network device 101 may be a base station NB in 2G and 3G, a base station eNB in LTE and 4G, a base station gNB in 5G, or the like. The terminal 102 may be a mobile phone, a tablet computer, a notebook computer, a palmtop computer, a mobile Internet device (MID), a wearable device (e.g., a smartwatch such as an Apple® iWatch, a smart band, or a pedometer), or a terminal device capable of accessing an operator network. The terminal 102 may be alternatively a smart household device such as a refrigerator, a television, an air conditioner, or an electricity meter. The terminal 102 may be alternatively a traffic device such as a car, a bicycle, an electric vehicle, an airplane, or a ship. The terminal 102 may be alternatively a device capable of performing wireless communication, such as an intelligent robot or a workshop device.

In the communications system 10, when the terminal 102 performs communication, the network device 101 is required to indicate channel state information (CSI) to the terminal device. The CSI includes a precoding matrix indicator (PMI) used to indicate a precoding matrix used for physical downlink shared channel (PDSCH) transmission. The network device may further indicate sounding reference signal (SRS) resource indication (SRI) information to the terminal device. This embodiment of the present disclosure focuses on how the terminal 102 determines, based on received a PMI indication and resource scheduling indication information, a precoding matrix used for data sending.

Figure 2:
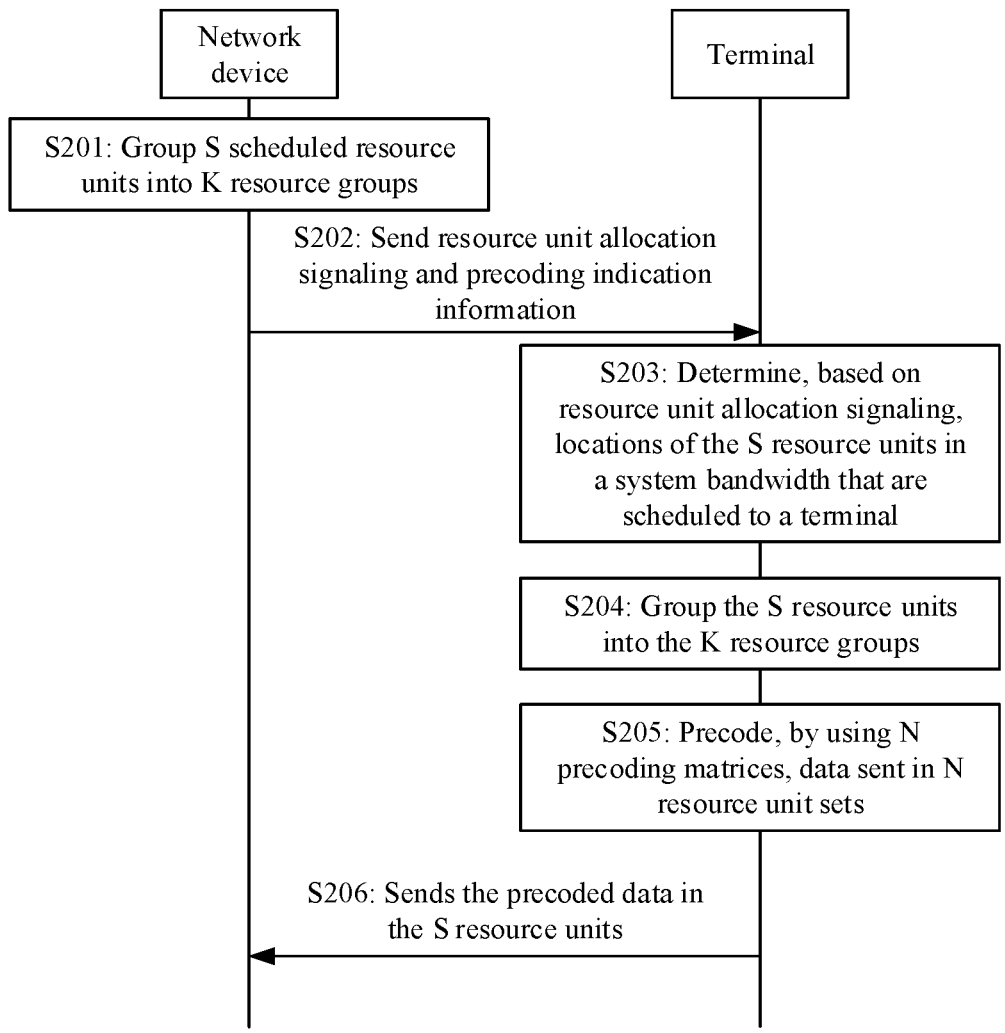
FIG. 2 is a schematic flowchart of a signaling receiving method according to an embodiment of the present disclosure.

FIG. 2 shows a signaling indication method according to an embodiment of the present disclosure. The method may be implemented based on the communications system 10 shown in FIG. 1. The method includes but is not limited to the following steps.

Step S201: A network device groups S scheduled resource units into K resource groups.

Figure 3:
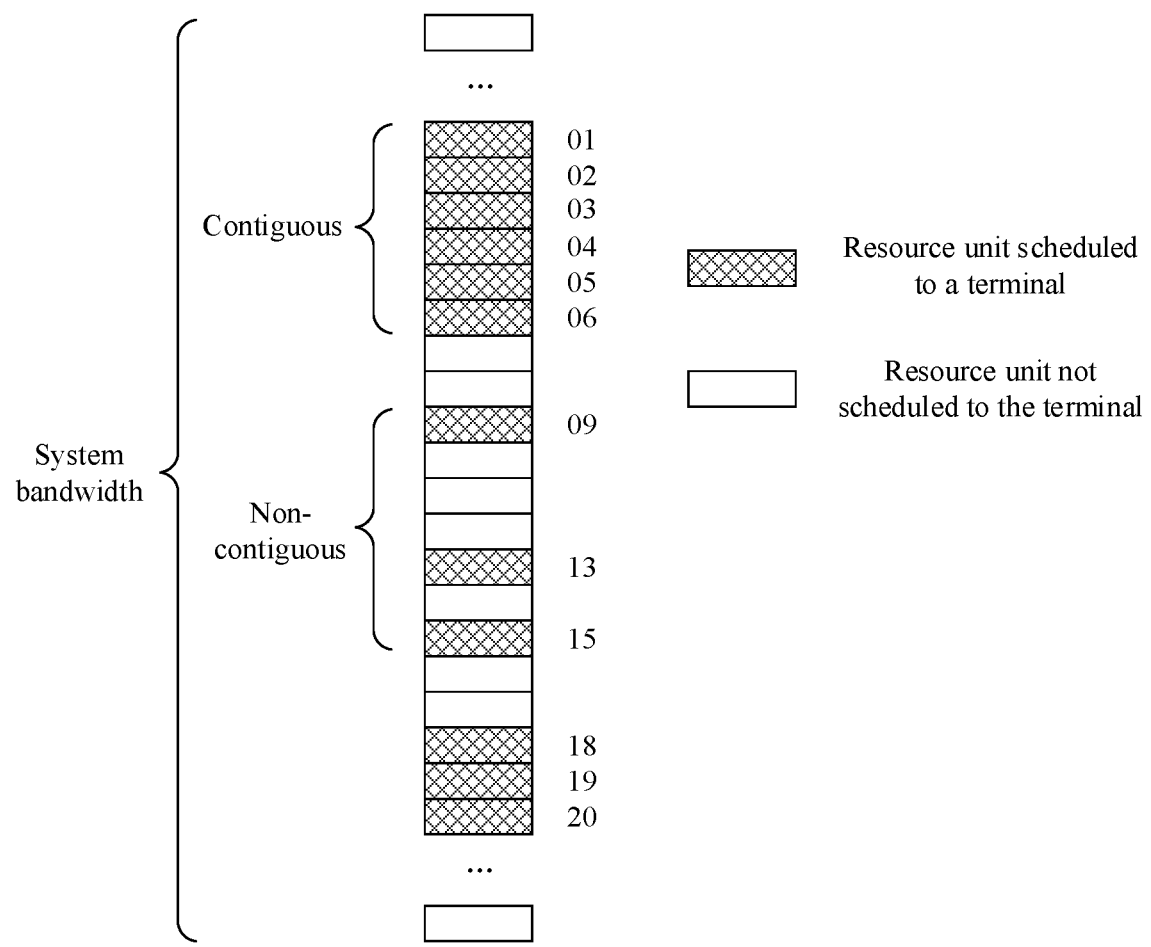
FIG. 3 is a schematic distribution diagram of resource units according to an embodiment of the present disclosure.

Specifically, resource units scheduled by the network device to a terminal may be referred to as the S resource units, where S is a positive integer. The S resource units may have contiguous or non-contiguous locations in a system bandwidth. FIG. 3 schematically shows contiguous and non-contiguous cases. In FIG. 3, resource units in grid areas are resource units scheduled to the terminal, and resource units in blank areas are resource units not scheduled to the terminal, which may be scheduled to another device or to any device at a current moment. In addition, the resource unit may be one resource block (RB) or a plurality of RBs, or one resource block group (RBG) or a plurality of RBGs.

Figure 4:
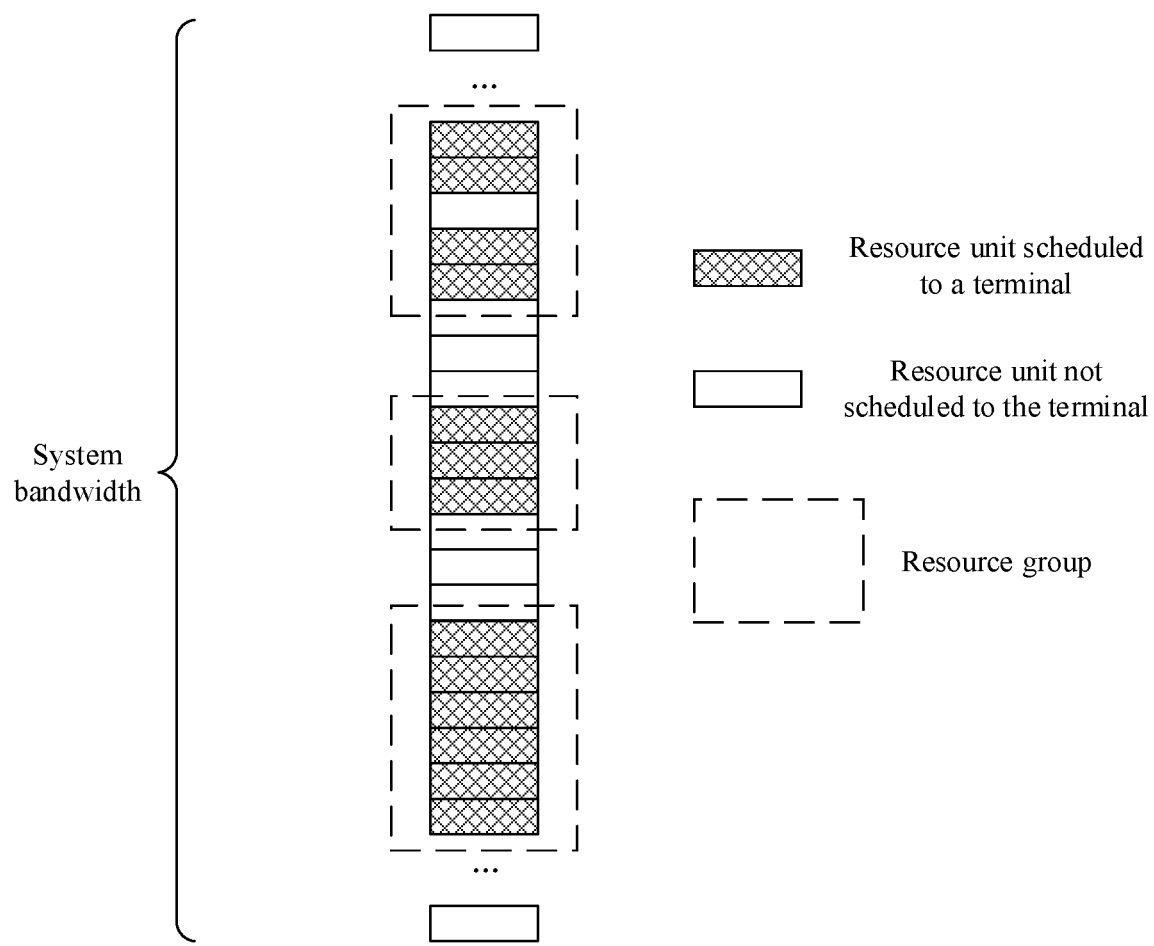
FIG. 4 is another schematic distribution diagram of resource units according to an embodiment of the present disclosure.

A grouping rule may be as follows: if a quantity of resource units that separate two adjacent resource units of the S resource units is less than a threshold M, the two adjacent resource units are grouped into a same group; or if a quantity of resource units that separate two adjacent resource units is not less than a threshold M, the two adjacent resource units are grouped into different groups, where M is a positive integer. "Adjacent" may be understood as follows: if two resource units are resource units both scheduled to the terminal for data transmission, and one of the resource units is a resource unit that is scheduled to the terminal preceding or following the other resource unit, then the two resource units are resource units adjacent to each other. As shown in FIG. 3, a resource unit adjacent to a resource unit 01 is a resource unit 02, resource units adjacent to the resource unit 02 are the resource unit 01 and a resource unit 03, resource units adjacent to a resource unit 09 are a resource unit 06 and a resource unit 13, and so on. The threshold M is a pre-obtained reference value used to determine the resource groups. The threshold M may be preconfigured in the terminal or may be obtained by the terminal based on indication information. The indication information is carried in higher layer signaling such as RRC signaling or downlink control information (DCI). The S resource units are grouped into the K groups according to the foregoing rule, each resource group includes at least one resource unit, resource units included in each resource group are different from each other, and each of the S resource units is included in one of the K resource groups, where K is a positive integer. In other words, the S resource units are grouped into the K resource groups. A first resource group and a second resource group are any two of the K resource groups, and a quantity of resource units between any resource unit in the first resource group and any resource unit in the second resource group in the system bandwidth is not less than the threshold M. A quantity of resource units between a first resource unit and a second resource unit in the system bandwidth is less than the threshold M. The first resource unit and the second resource unit are two resource units in any one of the K resource groups. In the system bandwidth, the first resource unit is a resource unit that is scheduled to the terminal preceding or following the second resource unit. Using FIG. 4 as an example, it is assumed that M=3, grid area are resource units scheduled to the terminal, and blank area are resource unit not scheduled to the terminal. It can be learned from FIG. 4 that there are 13 resource units scheduled to the terminal, and three resource groups may be obtained by grouping the 13 resource units according to the foregoing rule.

Step S202: The network device sends resource unit allocation signaling and precoding indication information.

Specifically, the resource unit allocation signaling indicates specific resource units scheduled to the terminal for data transmission. For example, the resource unit allocation signaling may be downlink control information (DCI). The precoding indication information is used to indicate N precoding matrices used for sending data in N resource unit sets, and a resource unit included in each of the N resource unit sets is determined based on the K resource groups, where S, K, and M are all positive integers. In this embodiment of the present disclosure, the resource unit allocation signaling and the precoding indication information may be sent simultaneously or sequentially. Which information is sent first in the sequential sending case is not limited herein. When the two pieces of information are sent simultaneously, the two pieces of information may be carried in one piece of signaling. Correspondingly, the terminal receives the resource unit allocation signaling and the precoding indication information.

In this embodiment of the present disclosure, the K resource groups need to be precoded by using the N precoding matrices. The K resource groups may be grouped into the N resource unit sets, and then data sent in one resource unit set is precoded by using one precoding matrix. The data sent in the N resource unit sets is exactly precoded by using the N precoding matrices. A manner of obtaining the N resource unit sets by grouping the K resource groups is specifically as follows.

In this embodiment of the present disclosure, a resource unit included in each of the N resource unit sets is determined based on the K resource groups. For example, the network device determines, based on the K resource groups, the resource unit included in each of the N resource unit sets. The resource unit included in each resource unit set belongs to the K resource groups, and resource units included in all of the resource unit sets are different from each other. The N resource unit sets may have the following features.

Feature 1: A resource unit included in at least one of the N resource unit sets is the same as a resource unit included in at least one of the K resource groups. There are two possible cases. In one case, the resource unit included in at least one of the N resource unit sets is the same as a resource unit included in one of the K resource groups. In the other case, the resource unit included in at least one of the N resource unit sets is the same as resource units included in a plurality of resource groups of the K resource groups. For example, a resource unit set A includes six resource units, two of the resource units are the same as resource units included in a resource group #0, and the other four resource units are the same as resource units included in a resource group #1. The resource unit set A is one of the N resource unit sets, and the resource group #0 and the resource group #1 are two of the K resource groups.

Feature 2: Resource units included in a plurality of resource unit sets of the N resource unit sets all belong to a same resource group of the K resource groups. For example, a resource unit set B includes three resource units, a resource unit set C includes five resource units, a resource group #2 includes eight resource units, three of the eight resource units are the same as the three resource units included in the resource unit set B, and the other five resource units are the same as the five resource units included in the resource unit set C. The resource unit set B and the resource unit set C are two of the N resource unit sets, and the resource group #2 is one of the K resource groups.

Feature 3: Each of the N resource unit sets belongs to a first-type resource unit set or a second-type resource unit set, and the first-type resource unit set and the second-type resource unit set are two types of resource unit sets with different attributes. A resource unit included in any resource unit set belonging to the first-type resource unit set is the same as a resource unit included in at least one of the K resource groups, and resource units included in a plurality of resource unit sets in the second-type resource unit set belong to a same resource group of the K resource groups. Optionally, for any one of the N resource unit sets, the any resource unit set is either the first-type resource unit set or the second-type resource unit set. It can be learned that Feature 3 is a combination of Feature 1 and Feature 2.

The foregoing describes a general relationship between the N resource unit sets and the K resource groups. The following describes several more specific solutions.

Figure 5:
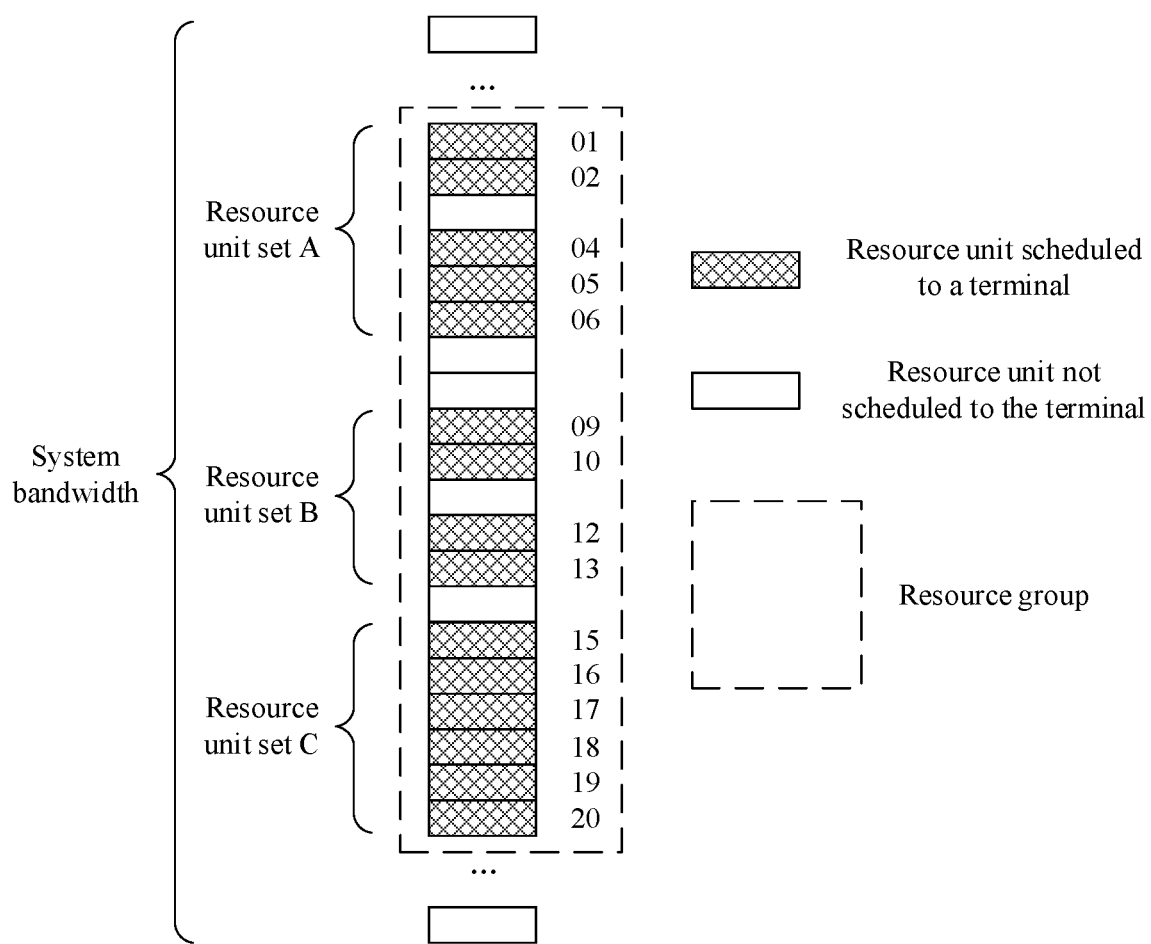
FIG. 5 is another schematic distribution diagram of resource units according to an embodiment of the present disclosure.

In a first optional solution, when K=1, the network device may group the K resource groups into N resource unit subsets. Each of the N resource unit sets is the same as one of the N resource unit subsets. For example, it is assumed that N is equal to 3. As shown in FIG. 5, the N resource unit sets are specifically a resource unit set A, a resource unit set B, and a resource unit set C; and the K resource groups include a resource unit 01, a resource unit 02, a resource unit 04, a resource unit 05, a resource unit 06, a resource unit 09, a resource unit 10, a resource unit 12, a resource unit 13, a resource unit 15, a resource unit 16, a resource unit 17, a resource unit 18, a resource unit 19, and a resource unit 20. In this case, the fifteen resource units may be grouped into three resource unit subsets. A first resource unit subset includes the resource unit 01, the resource unit 02, the resource unit 04, the resource unit 05, and the resource unit 06; a second resource unit subset includes the resource unit 09, the resource unit 10, the resource unit 12, and the resource unit 13; and a third resource unit subset includes the resource unit 15, the resource unit 16, the resource unit 17, the resource unit 18, the resource unit 19, and the resource unit 20. In this way, the resource unit set A is the same as the first resource unit subset, the resource unit set B is the same as the second resource unit subset, and the resource unit set C is the same as the third resource unit subset.

In a second optional solution, when K>N, each of the N resource unit sets includes at least one of the K resource groups and different resource unit sets include different resource groups. For example, K is equal to 4; N is equal to 3; the K resource groups are a resource group #0, a resource group #1, a resource group #2, and a resource group #3; and the N resource unit sets are a resource unit set A, a resource unit set B, and a resource unit set C. In this case, a resource group included in each of the N resource units sets may be as follows: The resource unit set A includes the resource group #0, the resource unit set B includes the resource group #1, and the resource unit set C includes the resource group #2 and the resource group #3.

In a third optional solution, 1<K, and each of the K resource groups includes at least one of the N resource unit sets. If a quantity of resource units included in a third resource group is greater than or equal to a quantity of resource units included in a fourth resource group, a quantity of resource unit sets included in the third resource group is not less than a quantity of resource unit sets included in the fourth resource group. The third resource group and the fourth resource group are any two of the K resource groups.

The third optional solution is specifically implemented in at least the following two specific manners.

Manner 1: When 1<K≤N, and different resource groups include different resource unit sets, each of the K resource groups includes one of K resource unit sets of the N resource unit sets, so that each of the K resource groups includes one resource unit set.

Then, the remaining (N−K) resource unit sets, of the N resource unit sets, that are not included in the K resource groups are allocated to the $1^{st}$ resource group, the $2^{nd}$ resource group, ..., and the $K^{th}$ resource group. The $1^{st}$ resource group, the $2^{nd}$ resource group, ..., and the $K^{th}$ resource group are obtained by sorting the K resource groups based on quantities of included resource units in descending order. A quantity $t_i$ of resource unit sets that are allocated to the $i^{th}$ resource group of the K resource groups is as follows:

$$t_i = \begin{cases} \lceil (X_i/S) \times (N-K) \rceil, & S_i \geq \lceil (X_i/S) \times (N-K) \rceil \\ S_i, & S_i < \lceil (X_i/S) \times (N-K) \rceil \end{cases} \quad 1\text{-}1$$

In Formula 1-1, K≥i≥1, $X_i$ represents a quantity of resource units sets included in the $i^{th}$ resource group, and $S_i$ represents a quantity of remaining resource unit sets after the resource unit sets are allocated to the $i^{th}$ resource group.

The resource unit set included in each of the K resource groups may be determined in Manner 1. Optionally, if a resource group of the K resource groups includes one resource unit set, a resource unit included in the one resource unit set is the same as a resource unit included in the resource group. Optionally, if a quantity j of resource sets included in a resource group of the K resource groups is greater than or equal to 2, the resource group may be referred to as a target resource group. The network device may divide the target resource group into j resource unit subsets. A resource unit included in each of the j resource unit sets is the same as a resource unit included in one of the j resource unit subsets, and each resource unit set corresponds to one resource unit subset.

Figure 6:
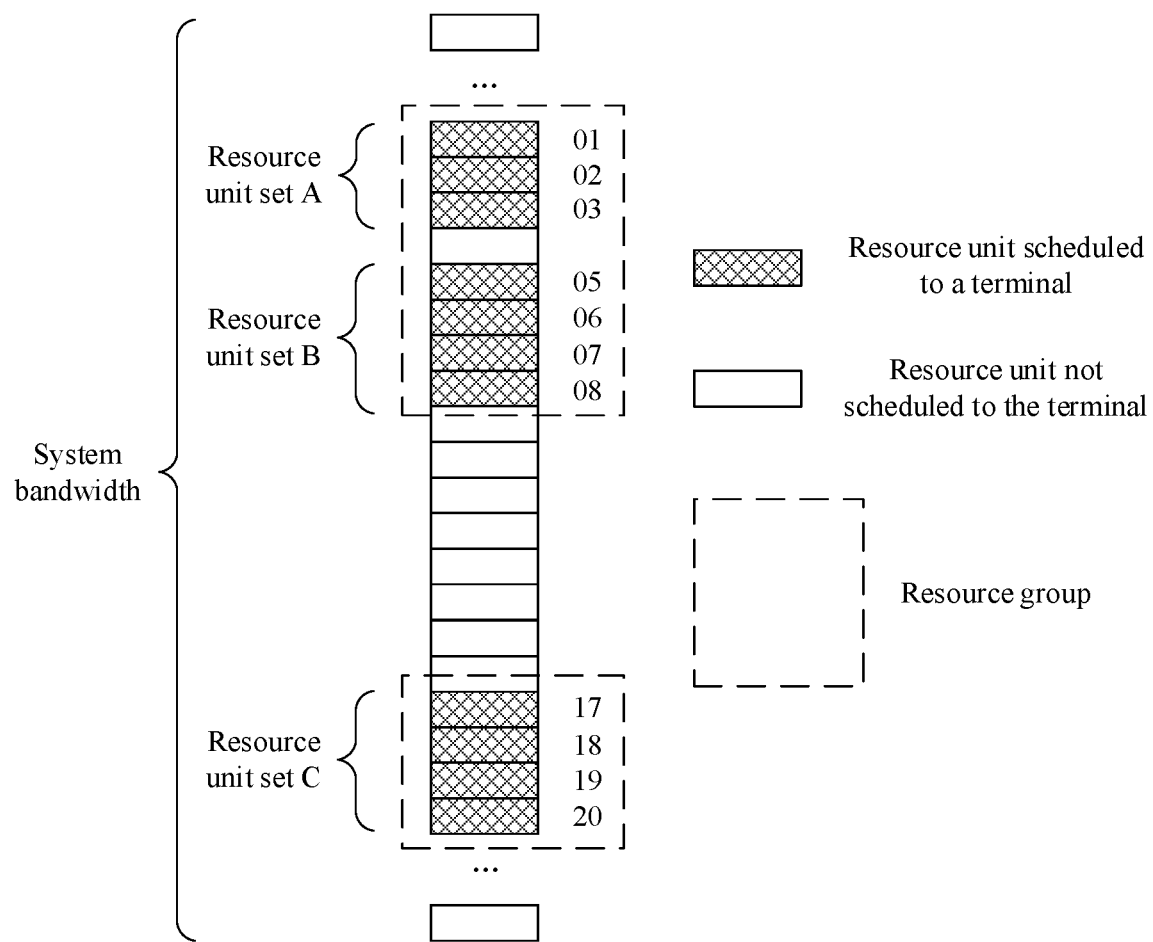
FIG. 6 is another schematic distribution diagram of resource units according to an embodiment of the present disclosure.
Figure 7:
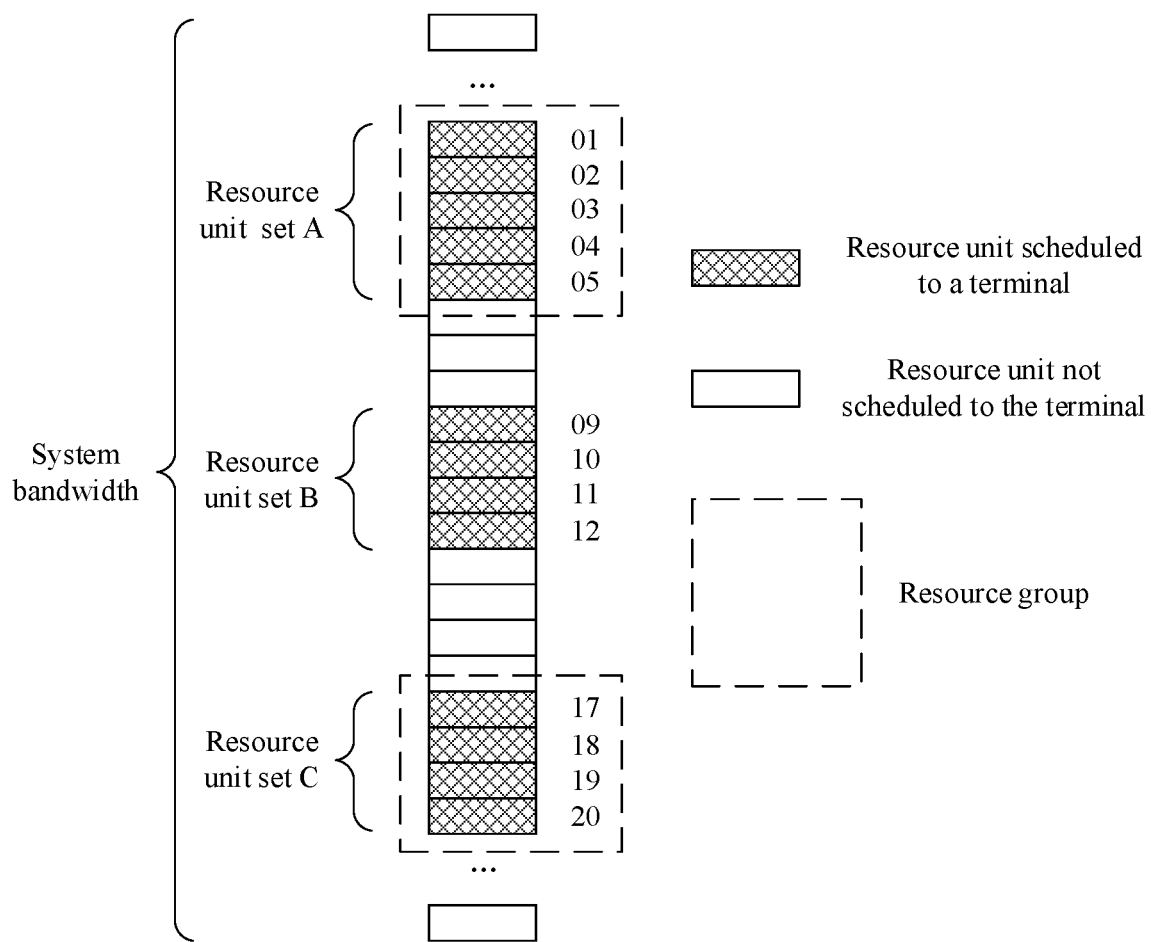
FIG. 7 is another schematic distribution diagram of resource units according to an embodiment of the present disclosure.

In other words, when 1<K≤N, first, each of the K resource groups includes one resource unit set. In this case, the remaining (N−K) resource unit sets are further used to be allocated to some of the K resource groups. Specifically, the resource unit sets are allocated based on a total quantity of resource units included in each resource group, and a larger quantity of included resource units indicates more allocated resource unit sets. For example, it is assumed that the K resource groups are a resource group #0 and a resource group #1, a quantity of resource units included in the resource group #0 is a, a quantity of resource units included in the resource group #1 is b, and S=a+b. In this case, $\lceil a/(a+b) \times (N-K) \rceil$ resource unit sets are allocated to the resource group #0, and $\lceil b/(a+b) \times (N-K) \rceil$ resource unit sets are allocated to the resource group #1. Considering that rounding up may cause that the actual remaining (N−K) resource unit sets are insufficient for the resource groups, the resource unit sets are allocated to the K resource groups based on quantities of included resource units in descending order, until all the (N−K) resource unit sets are completely allocated. Optionally, assuming that a resource group corresponds to j (j>1) resource unit sets in this case, the resource group may further be evenly divided into j resource unit subsets (equivalent to subbands) based on an occupied frequency band, so that each resource unit subset includes one of the j resource unit sets. As shown in FIG. 6, a resource unit set A and a resource unit set B include a first resource group in the figure, a resource unit set C includes a second resource group in the figure. In the first resource group, the first three resource units are included in the resource unit set A, the last four resource units are included in the resource unit set B. It should be noted that, if N=K, one resource group exactly includes one resource unit set, and an inclusion relationship between a resource group and a resource unit set is shown in FIG. 7.

Manner 2: First, (N−1) resource unit sets of the N resource unit sets correspond to the $1^{st}$ resource group, the $2^{nd}$ resource group, ..., and the $K^{th}$ resource group. The $1^{st}$ resource group, the $2^{nd}$ resource group, ..., and the $K^{th}$ resource group are obtained by sorting the K resource groups based on quantities of included resource units in descending order. A quantity $r_i$ of resource unit sets that correspond to the $i^{th}$ resource group of the K resource groups is as follows:

$$r_i = \begin{cases} \lceil (X_i/S) \times (N-1) \rceil, & S_i \geq \lceil (X_i/S) \times (N-1) \rceil \\ S_i, & S_i < \lceil (X_i/S) \times (N-1) \rceil \end{cases} \qquad 1\text{-}2$$

In Formula 1-2, K≥i≥1, $X_i$ represents a quantity of resource units sets included in the $i^{th}$ resource group, and $S_i$ represents a quantity of remaining resource unit sets after the resource unit sets are allocated to the $i^{th}$ resource group.

Then, if the quantity $r_i$ of resource unit sets corresponding to the $i^{th}$ resource group is equal to 0, it is redefined that the $i^{th}$ resource group corresponds to one resource unit set other than the (N−1) resource unit sets that are of the N resource unit sets and that already correspond to the resource groups.

The resource unit set corresponding to each of the K resource groups may be determined in Manner 2. Then, it is specified that any resource group includes a resource unit set corresponding to the resource group. Optionally, if a resource group of the K resource groups corresponds to one resource unit set, a resource unit included in the one resource unit set is the same as a resource unit included in the resource group. Optionally, if a quantity j of resource sets included in a resource group of the K resource groups is greater than or equal to 2, the resource group may be referred to as a target resource group. The network device may first divide the target resource group into j resource unit subsets. A resource unit included in each of the j resource unit sets is the same as a resource unit included in one of the j resource unit subsets respectively, and each resource unit set corresponds to one resource unit subset.

In other words, first, the (N−1) resource unit sets of the N resource unit sets correspond to the K resource groups based on a quantity of resource units included in each of the K resource groups. It is assumed that the K resource groups are a resource group #0 and a resource group #1, a quantity of resource units included in the resource group #0 is a, a quantity of resource units included in the resource group #1 is b, and S=a+b. In this case, $\lceil a/(a+b) \times (N-1) \rceil$ resource unit sets correspond to the resource group #0, and $\lceil b/(a+b) \times (N-1) \rceil$ resource unit sets correspond to the resource group #1. Considering that rounding up may cause that the actual remaining (N−1) resource unit sets are insufficient for the resource groups, the resource unit sets correspond to (or are allocated to) the K resource groups based on quantities of included resource units in descending order, until all the (N−1) resource unit sets are completely allocated. Optionally, assuming that a resource group corresponds to j (j>1) resource unit sets in this case, the resource group may further be evenly divided into j resource unit subsets based on an occupied frequency band, so that each resource unit subset corresponds to one of the j resource unit sets. If quantities of resource unit sets corresponding to some resource groups are 0, it is redefined that the some resource groups correspond to those resource unit sets other than the (N−1) resource unit sets of the N resource unit sets.

Step S203: The terminal determines, based on the resource unit allocation signaling, locations of the S resource units in the system bandwidth that are scheduled to the terminal.

Specifically, the terminal correspondingly receives the resource unit allocation signaling, and determines, based on the resource unit allocation signaling, a quantity of resource units scheduled to the terminal and a location of each scheduled resource unit in the system bandwidth. Optionally, the resource unit allocation signaling includes a bitmap, to indicate a location, in the system bandwidth, of each resource unit scheduled to the terminal. In this way, the terminal can determine, based on the resource unit allocation signaling, the location, in the system bandwidth, of each resource unit scheduled to the terminal.

Step S204: The terminal groups the S resource units into the K resource groups.

Specifically, a manner of determining the K resource groups by the terminal based on the S resource units is the same as the manner of determining the resource groups by the network device based on the S resource units in step S202. Details are not described herein again.

Step S205: The terminal precodes, by using the N precoding matrices, the data sent in the N resource unit sets.

Specifically, a quantity of precoding matrices used for precoding may be predefined in a protocol, or may be indicated by the network device. Optionally, before precoding, by using the N precoding matrices, the data sent in the N resource unit sets, the terminal receives the precoding indication information. The precoding indication information may indicate the N precoding matrices by including a precoding matrix indicator (PMI), or the precoding indication information may be SRS resource indication (SRI) signaling, where the SRI is used to indicate one SRS resource selected from at least two precoded SRS resources sent by the terminal. The terminal may determine one precoding matrix based on the SRI, and then precodes, based on the N precoding matrices that are determined based on the precoding indication information, the data sent in the N resource unit sets. The terminal needs to use the N precoding matrices to precode the data sent in the N resource unit sets. Specifically, the terminal uses one precoding matrix to encode data sent in one resource unit set. The precoding matrices used for sending the data in the N resource unit sets are different from each other, all resource units included in the N resource unit sets are the same as the S resource units, and resource units included in all of the N resource unit sets are different from each other.

In this embodiment of the present disclosure, a resource unit included in each of the N resource unit sets is determined based on the K resource groups. For example, the terminal determines, based on the K resource groups, the resource unit included in each of the N resource unit sets. The resource unit included in each resource unit set belongs to the K resource groups, and resource units included in all of the resource unit sets are different from each other. The N resource unit sets may have the following features.

Feature 1: A resource unit included in at least one of the N resource unit sets is the same as a resource unit included in at least one of the K resource groups. There are two possible cases. In one case, the resource unit included in at least one of the N resource unit sets is the same as a resource unit included in one of the K resource groups. In the other case, the resource unit included in at least one of the N resource unit sets is the same as resource units included in a plurality of resource groups of the K resource groups. For example, a resource unit set A includes six resource units, two of the resource units are the same as resource units included in a resource group #0, and the other four resource units are the same as resource units included in a resource group #1. The resource unit set A is one of the N resource unit sets, and the resource group #0 and the resource group #1 are two of the K resource groups.

Feature 2: Resource units included in a plurality of resource unit sets of the N resource unit sets all belong to a same resource group of the K resource groups. For example, a resource unit set B includes three resource units, a resource unit set C includes five resource units, a resource group #2 includes eight resource units, three of the eight resource units are the same as the three resource units included in the resource unit set B, and the other five resource units are the same as the five resource units included in the resource unit set C. The resource unit set B and the resource unit set C are two of the N resource unit sets, and the resource group #2 is one of the K resource groups.

Feature 3: Each of the N resource unit sets belongs to a first-type resource unit set or a second-type resource unit set, and the first-type resource unit set and the second-type resource unit set are two types of resource unit sets with different attributes. A resource unit included in any resource unit set belonging to the first-type resource unit set is the same as a resource unit included in at least one of the K resource groups, and resource units included in a plurality of resource unit sets in the second-type resource unit set belong to a same resource group of the K resource groups. Optionally, for any one of the N resource unit sets, the any resource unit set is either the first-type resource unit set or the second-type resource unit set. It can be learned that Feature 3 is a combination of Feature 1 and Feature 2.

The foregoing describes a general relationship between the N resource unit sets and the K resource groups. The following describes several more specific solutions.

In a first optional solution, when K=1, before precoding, by using the N precoding matrices, the data sent in the N resource unit sets, the terminal further groups the K resource groups into the N resource unit subsets. Each of the N resource unit sets is the same as one of the N resource unit subsets. For example, it is assumed that N is equal to 3. As shown in FIG. 5, the N resource unit sets are specifically a resource unit set A, a resource unit set B, and a resource unit set C; and the K resource groups include a resource unit 01, a resource unit 02, a resource unit 04, a resource unit 05, a resource unit 06, a resource unit 06, a resource unit 09, a resource unit 10, a resource unit 12, a resource unit 13, a resource unit 15, a resource unit 16, a resource unit 17, a resource unit 18, a resource unit 19, and a resource unit 20. In this case, the 15 resource units may be grouped into three resource unit subsets. A first resource unit subset includes the resource unit 01, the resource unit 02, the resource unit 04, the resource unit 05, and the resource unit 06; a second resource unit subset includes the resource unit 09, the resource unit 10, the resource unit 12, and the resource unit 13; and a third resource unit subset includes the resource unit 15, the resource unit 16, the resource unit 17, the resource unit 18, the resource unit 19, and the resource unit 20. In this way, the resource unit set A is the same as the first resource unit subset, the resource unit set B is the same as the second resource unit subset, and the resource unit set C is the same as the third resource unit subset.

In a second optional solution, when K>N, each of the N resource unit sets includes at least one of the K resource groups and different resource unit sets include different resource groups. For example, K is equal to 4; N is equal to 3; the K resource groups are a resource group #0, a resource group #1, a resource group #2, and a resource group #3; and the N resource unit sets are a resource unit set A, a resource unit set B, and a resource unit set C. In this case, the resource unit set A includes the resource group #0, the resource unit set B includes the resource group #1, and the resource unit set C includes the resource group #2 and the resource group #3.

In a third optional solution, 1<K, and each of the K resource groups includes at least one of the N resource unit sets. If a quantity of resource units included in a third resource group is greater than or equal to a quantity of resource units included in a fourth resource group, a quantity of resource unit sets included in the third resource group is not less than a quantity of resource unit sets corresponding to the fourth resource group. The third resource group and the fourth resource group are any two of the K resource groups. The third optional solution is specifically implemented in at least the following two specific manners.

Manner 1: When 1<K≤N, and different resource groups include different resource unit sets, first, K resource unit sets of the N resource unit sets correspond to the K resource groups, so that each of the K resource groups corresponds to one resource unit set.

Then, the remaining (N−K) resource unit sets, of the N resource unit sets, that do not correspond to the K resource groups correspond to the $1^{st}$ resource group, the $2^{nd}$ resource group, . . . , and the $K^{th}$ resource group. The $1^{st}$ resource group, the $2^{nd}$ resource group, . . . , and the $K^{th}$ resource group are obtained by sorting the K resource groups based on quantities of included resource units in descending order. A quantity $t_i$ of resource unit sets that correspond to the $i^{th}$ resource group of the K resource groups is as follows:

$$t_i = \begin{cases} \lceil (X_i/S)*(N-K) \rceil, S_i \geq \lceil (X_i/S)*(N-K) \rceil \\ S_i, S_i < \lceil (X_i/S) \times (N-K) \rceil \end{cases} \quad 1\text{-}1$$

In Formula 1-1, K≥i≥1, $X_i$ represents a quantity of resource units sets included in the $i^{th}$ resource group, and $S_i$ represents a quantity of remaining resource unit sets after the resource unit sets are allocated to the $i^{th}$ resource group.

The resource unit set corresponding to each of the K resource groups may be determined in Manner 1. Then, it is specified that any resource group includes a resource unit set corresponding to the resource group. Optionally, if a resource group of the K resource groups corresponds to one resource unit set, a resource unit included in the one resource unit set is the same as a resource unit included in the resource group. Optionally, if a quantity j of resource sets included in a resource group of the K resource groups is greater than or equal to 2, the resource group may be referred to as a target resource group. Before precoding, by using the N precoding matrices, the data sent in the data in the N resource unit sets, the terminal may divide the target resource group into j resource unit subsets. A resource unit included in each of the j resource unit sets is the same as a resource unit included in one of the j resource unit subsets, and each resource unit set corresponds to one resource unit subset.

In other words, when 1<K≤N, first, each of the K resource groups corresponds to one resource unit set. In this case, the remaining (N−K) resource unit sets are further used to correspond to some of the K resource groups. Specifically, the resource unit sets are allocated based on a total quantity of resource units included in each resource group, and a larger quantity of included resource units indicates more corresponding resource unit sets. For example, it is assumed that the K resource groups are a resource group #0 and a resource group #1, a quantity of resource units included in the resource group #0 is a, a quantity of resource units included in the resource group #1 is b, and S=a+b. In this case, ⌈a/(a+b)×(N−K)⌉ resource unit sets correspond to the resource group #0, and ⌈b/(a+b)×(N−K)⌉ resource unit sets correspond to the resource group #1. Considering that rounding up may cause that the actual remaining (N−K) resource unit sets are insufficient for the resource groups, the resource unit sets correspond to (or are allocated to) the K resource groups based on quantities of included resource units in descending order, until all the (N−K) resource unit sets are completely allocated. Optionally, assuming that a resource group corresponds to j (j>1) resource unit sets in this case, the resource group may further be evenly divided into j resource unit subsets (equivalent to subbands) based on an occupied frequency band, so that each resource unit subset corresponds to one of the j resource unit sets. As shown in FIG. 6, a resource unit set A and a resource unit set B correspond to a first resource group in the figure, a resource unit set C corresponds to a second resource group in the figure. In the first resource group, the first three resource units correspond to the resource unit set A, the last four resource units correspond to the resource unit set B. It should be noted that, if N=K, one resource group exactly corresponds to one resource unit set, and an inclusion relationship between a resource group and a resource unit set is shown in FIG. 7.

Manner 2: First, (N−1) resource unit sets of the N resource unit sets are allocated to the 1$^{st}$ resource group, the 2$^{nd}$ resource group, . . . , and the Kth resource group. The 1$^{st}$ resource group, the 2$^{nd}$ resource group, . . . , and the K$^{th}$ resource group are obtained by sorting the K resource groups based on quantities of included resource units in descending order. A quantity $r_i$ of resource unit sets that are allocated to the i$^{th}$ resource group of the K resource groups is as follows:

$$r_i = \begin{cases} \lceil (X_i/S) \times (N-1) \rceil, & S_i \geq \lceil (X_i/S) \times (N-1) \rceil \\ S_i, & S_i < \lceil (X_i/S) \times (N-1) \rceil \end{cases} \quad 1\text{-}2$$

In Formula 1-2, K≥i≥1, $X_i$ represents a quantity of resource units sets included in the i$^{th}$ resource group, and $S_i$ represents a quantity of remaining resource unit sets after the resource unit sets are allocated to the i$^{th}$ resource group.

Then, if the quantity $r_i$ of resource unit sets allocated to the i$^{th}$ resource group is equal to 0, it is redefined that the i$^{th}$ resource group includes one resource unit set other than the (N−1) resource unit sets that are of the N resource unit sets and that already correspond to the resource groups.

The resource unit set included in each of the K resource groups may be determined in Manner 2. Optionally, if a resource group of the K resource groups includes one resource unit set, a resource unit included in the one resource unit set is the same as a resource unit included in the resource group. Optionally, if a quantity j of resource sets included in a resource group of the K resource groups is greater than or equal to 2, the resource group may be referred to as a target resource group. Before precoding, by using the N precoding matrices, the data sent in the N resource unit sets, the terminal may divide the target resource group into j resource unit subsets. A resource unit included in each of the j resource unit sets is the same as a resource unit included in one of the j resource unit subsets, and each resource unit set corresponds to one resource unit subset.

In other words, first, the (N−1) resource unit sets of the N resource unit sets are allocated to the K resource groups based on a quantity of resource units included in each of the K resource groups. It is assumed that the K resource groups are a resource group #0 and a resource group #1, a quantity of resource units included in the resource group #0 is a, a quantity of resource units included in the resource group #1 is b, and S=a+b. In this case, ⌈a/(a+b)×(N−1)⌉ resource unit sets are allocated to the resource group #0, and ⌈b/(a+b)×(N−1)⌉ resource unit sets are allocated to the resource group #1. Considering that rounding up may cause that the actual remaining (N−1) resource unit sets are insufficient for the resource groups, resource unit sets are allocated to the K resource groups based on quantities of included resource units in descending order, until all the (N−1) resource unit sets are completely allocated. Optionally, assuming that a resource group includes j (j>1) resource unit sets in this case, the resource group may further be evenly divided into j resource unit subsets based on an occupied frequency band, so that each resource unit subset includes one of the j resource unit sets. If quantities of resource unit sets included in some resource groups are 0, it is redefined that the some resource groups include those resource unit sets other than the (N−1) resource unit sets of the N resource unit sets.

Step S206: The terminal sends the precoded data in the S resource units.

According to the method described in FIG. 2, when the data sent in the S scheduled resource units needs to be precoded, the S resource units are first grouped into the K resource groups based on intervals between the S resource units, so that resource units with a larger interval are grouped into different resource groups, and resource units with a smaller interval are grouped into a same group; and then a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio of a precoded data signal on a receive side. In addition, a precoding matrix used for sending data at a relatively large system bandwidth can be indicated by properly using a limited quantity of PMIs.

The foregoing describes the method in the embodiment of the present disclosure in detail, and the following provides an apparatus in an embodiment of the present disclosure.

Figure 8:
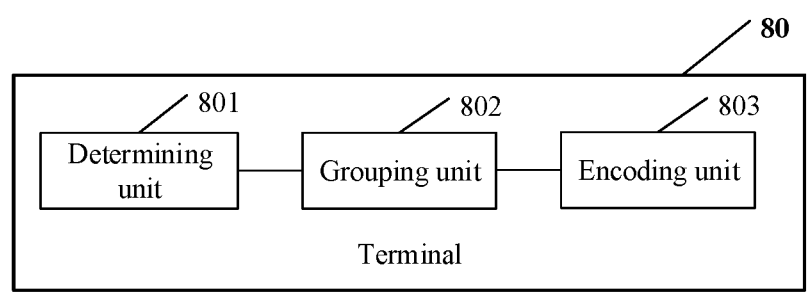
FIG. 8 is a schematic structural diagram of a terminal according to an embodiment of the present disclosure.

FIG. 8 is a schematic structural diagram of a terminal 80 according to an embodiment of the present disclosure. The terminal 80 may include a determining unit 801, a grouping unit 802, and an encoding unit 803. The units are described in detail as follows.

The determining unit 801 is configured to determine, based on resource unit allocation signaling, locations of S resource units in a system bandwidth that are scheduled to the terminal. The grouping unit 802 is configured to group the S resource units into K resource groups, where a quantity of resource units that separate any resource unit in a first resource group from any resource unit in a second resource group in the system bandwidth is not less than a threshold M, the first resource group and the second resource group are any two of the K resource groups, a quantity of resource units that separate a first resource unit from a second resource unit in the system bandwidth is less than the threshold M, the first resource unit and the second resource unit are two resource units in any one of the K resource groups, and in the system bandwidth, the first resource unit is a resource unit that is scheduled to the terminal preceding or following the second resource unit. The encoding unit 803 is configured to precode, by using N precoding matrices, data sent in N resource unit sets, where resource units included in each of the N resource unit sets are determined based on the K resource groups, S, K, and M are all positive integers, and all resource units included in the N resource unit sets are the same as the S resource units.

According to the foregoing steps, when the data sent in the S scheduled resource units needs to be precoded, first, the S resource units are grouped into the K resource groups based on intervals between the S resource units, so that resource units with a relatively large interval are grouped into different resource groups, and resource units with a relatively small interval are grouped into a same group. Then, a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio and improve encoding and decoding performance of a precoded data signal on a receive side. In addition, a precoding matrix used for sending data at a relatively large system bandwidth can be indicated by properly using a limited quantity of PMIs, and a relatively large system bandwidth can be indicated by using the limited quantity of PMIs.

Optionally, each of the N resource unit sets belongs to a first-type resource unit set or a second-type resource unit set, resource units included in any resource unit set belonging to the first-type resource unit set are the same as resource units included in at least one of the K resource groups, and resource units included in a plurality of resource unit sets in the second-type resource unit set belong to a same resource group of the K resource groups.

Optionally, when a value of K is not greater than a value of N and K is greater than 1, each of the K resource groups includes at least one of the N resource unit sets and different resource groups correspond to different resource unit sets; if a quantity of resource units included in a third resource group is greater than or equal to a quantity of resource units included in a fourth resource group, a quantity of resource unit sets included in the third resource group is not less than a quantity of resource unit sets included in the fourth resource group; and the third resource group and the fourth resource group are any two of the K resource groups.

Optionally, the terminal further includes a division unit. Before the encoding unit precodes, by using the N precoding matrices, the data sent in the N resource unit sets, the division unit is configured to divide a target resource group into j resource unit subsets, where the target resource group is a resource group whose quantity j of included resource unit sets is greater than or equal to 2 in the K resource groups, and each of j resource unit sets included in the target resource group is the same as each of the j resource unit subsets respectively.

Optionally, when the value of K is 1, before the encoding unit precodes, by using the N precoding matrices, the data sent in the N resource unit sets, the division unit is configured to group the K resource groups into N resource unit subsets, where each of the N resource unit sets is the same as each of the N resource unit subsets respectively.

Optionally, when the value of K is greater than the value of N, each of the N resource unit sets includes at least one of the K resource groups and different resource unit sets include different resource groups.

Optionally, the threshold M is preconfigured in the terminal or is obtained by the terminal based on indication information, and the indication information is carried in higher layer signaling or downlink control information DCI.

It should be noted that for implementation of the units, reference may be made to corresponding descriptions in the method embodiment shown in FIG. 2.

According to the terminal 80 shown in FIG. 8, when the data sent in the S scheduled resource units needs to be precoded, first, the S resource units are grouped into the K resource groups based on intervals between the S resource units, so that resource units with a relatively large interval are grouped into different resource groups, and resource units with a relatively small interval are grouped into a same group. Then, a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio and improve encoding and decoding performance of a precoded data signal on a receive side. In addition, a precoding matrix used for sending data at a relatively large system bandwidth can be indicated by properly using a limited quantity of PMIs, and a relatively large system bandwidth can be indicated by using the limited quantity of PMIs.

Figure 9:
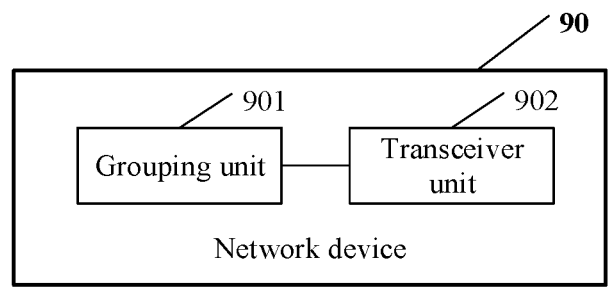
FIG. 9 is a schematic structural diagram of a network device according to an embodiment of the present disclosure.

FIG. 9 is a schematic structural diagram of a network device 90 according to an embodiment of the present disclosure. The network device 90 may include a grouping unit 901 and a transceiver unit 902. The units are described in detail as follows.

The grouping unit 901 is configured to group S scheduled resource units into K resource groups, where a quantity of resource units that separate any resource unit in a first resource group from any resource unit in a second resource group in the system bandwidth is not less than a threshold M, the first resource group and the second resource group are any two of the K resource groups, a quantity of resource units that separate a first resource unit from a second resource unit in the system bandwidth is less than the threshold M, the first resource unit and the second resource unit are two resource units in any one of the K resource groups, and in the system bandwidth, the first resource unit is a resource unit that is scheduled to the terminal preceding or following the second resource unit. The transceiver unit 902 is configured to send resource unit allocation signaling, where the resource unit allocation signaling is used to indicate the S scheduled resource units. The transceiver unit 902 is further configured to send precoding indication information, where the precoding indication information is used to indicate N precoding matrices that are used for sending data in N resource unit sets, resource units included in each of the N resource unit sets are determined based on the K resource groups, S, K, M, and N are all positive integers, and all resource units included in the N resource unit sets are the same as the S resource units.

According to the foregoing steps, when the data sent in the S scheduled resource units needs to be precoded, first, the S resource units are grouped into the K resource groups based on intervals between the S resource units, so that resource units with a relatively large interval are grouped into different resource groups, and resource units with a relatively small interval are grouped into a same group. Then, a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio and improve encoding and decoding performance of a precoded data signal on a receive side. In addition, a precoding matrix used for sending data at a relatively large system bandwidth can be indicated by properly using a limited quantity of PMIs, and a relatively large system bandwidth can be indicated by using the limited quantity of PMIs.

Optionally, each of the N resource unit sets belongs to a first-type resource unit set or a second-type resource unit set, resource units included in any resource unit set belonging to the first-type resource unit set are the same as resource units included in at least one of the K resource groups, and resource units included in a plurality of resource unit sets in the second-type resource unit set belong to a same resource group of the K resource groups.

Optionally, when a value of K is not greater than a value of N and K is greater than 1, each of the K resource groups includes at least one of the N resource unit sets and different resource groups correspond to different resource unit sets; if a quantity of resource units included in a third resource group is greater than or equal to a quantity of resource units included in a fourth resource group, a quantity of resource unit sets included in the third resource group is not less than a quantity of resource unit sets included in the fourth resource group; and the third resource group and the fourth resource group are any two of the K resource groups.

Optionally, the grouping unit 901 is further configured to divide a target resource group into j resource unit subsets, where the target resource group is a resource group whose quantity j of included resource unit sets is greater than or equal to 2 in the K resource groups, and each of j resource unit sets included in the target resource group is the same as each of the j resource unit subsets respectively.

Optionally, when the value of K is 1, the grouping unit 901 is further configured to group the K resource groups into N resource unit subsets, where each of the N resource unit sets is the same as each of the N resource unit subsets respectively.

Optionally, when the value of K is greater than the value of N, each of the N resource unit sets includes at least one of the K resource groups and different resource unit sets include different resource groups.

Optionally, the threshold M is preconfigured in the terminal or is obtained by the terminal based on indication information, and the indication information is carried in higher layer signaling or downlink control information DCI.

It should be noted that for implementation of the units, reference may be made to corresponding descriptions in the method embodiment shown in FIG. 2.

According to the network device 90 shown in FIG. 9, when the data sent in the S scheduled resource units needs to be precoded, first, the S resource units are grouped into the K resource groups based on intervals between the S resource units, so that resource units with a relatively large interval are grouped into different resource groups, and resource units with a relatively small interval are grouped into a same group. Then, a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio and improve encoding and decoding performance of a precoded data signal on a receive side. In addition, a precoding matrix used for sending data at a relatively large system bandwidth can be indicated by properly using a limited quantity of PMIs, and a relatively large system bandwidth can be indicated by using the limited quantity of PMIs.

Figure 10:
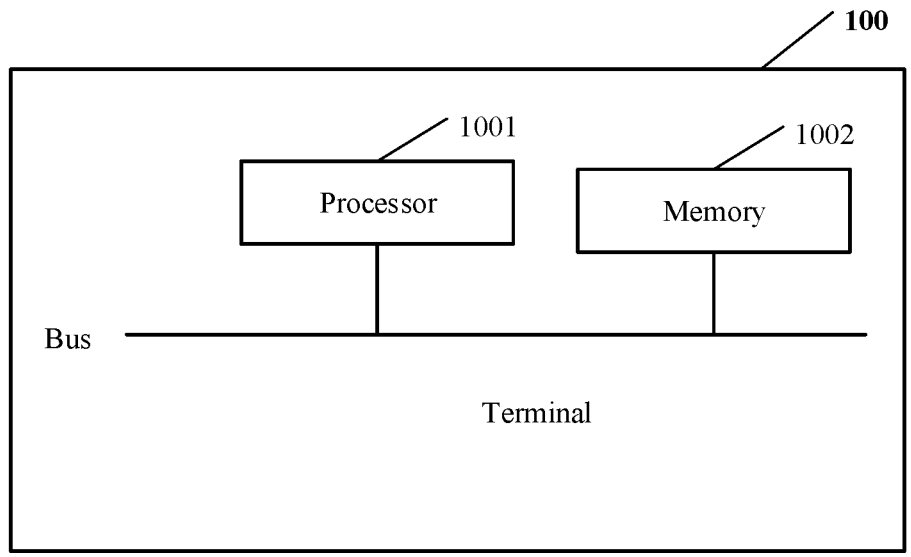
FIG. 10 is a schematic structural diagram of another terminal according to an embodiment of the present disclosure.

FIG. 10 shows a terminal 100 according to an embodiment of the present disclosure. The terminal 100 includes a processor 1001 and a memory 1002, and the processor 1001 and the memory 1002 are connected to each other by using a bus.

The memory 1002 includes but is not limited to a random access memory (RAM), a read-only memory (ROM), an erasable programmable read only memory (EPROM), or a compact disc read-only memory (CD-ROM). The memory 1002 is configured to store a related instruction and related data. The processor 1001 may be one or more central processing units (CPU). When the processor 1001 is one CPU, the CPU may be a single-core CPU or a multi-core CPU.

The processor 1001 in the terminal 100 is configured to read program code stored in the memory 1002, to perform the following operations:

determining, based on resource unit allocation signaling, locations of S resource units in a system bandwidth that are scheduled to the terminal; grouping the S resource units into K resource groups, where a quantity of resource units that separate any resource unit in a first resource group from any resource unit in a second resource group in the system bandwidth is not less than a threshold M, the first resource group and the second resource group are any two of the K resource groups, a quantity of resource units that separate a first resource unit from a second resource unit in the system bandwidth is less than the threshold M, the first resource unit and the second resource unit are two resource units in any one of the K resource groups, and in the system bandwidth, the first resource unit is a resource unit that is scheduled to the terminal preceding or following the second resource unit; and precoding, by using N precoding matrices, data sent in N resource unit sets, where resource units included in each of the N resource unit sets are determined based on the K resource groups, S, K, and M are all positive integers, and all resource units included in the N resource unit sets are the same as the S resource units.

According to the foregoing operations, when the data sent in the S scheduled resource units needs to be precoded, first, the S resource units are grouped into the K resource groups based on intervals between the S resource units, so that resource units with a relatively large interval are grouped into different resource groups, and resource units with a relatively small interval are grouped into a same group. Then, a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio and improve encoding and decoding performance of a precoded data signal on a receive side. In addition, a precoding matrix used for sending data at a relatively large system bandwidth can be indicated by properly using a limited quantity of PMIs, and a relatively large system bandwidth can be indicated by using the limited quantity of PMIs.

Optionally, each of the N resource unit sets belongs to a first-type resource unit set or a second-type resource unit set, resource units included in any resource unit set belonging to the first-type resource unit set are the same as resource units included in at least one of the K resource groups, and resource units included in a plurality of resource unit sets in the second-type resource unit set belong to a same resource group of the K resource groups.

Optionally, when a value of K is not greater than a value of N and K is greater than 1, each of the K resource groups includes at least one of the N resource unit sets and different resource groups correspond to different resource unit sets; if a quantity of resource units included in a third resource group is greater than or equal to a quantity of resource units included in a fourth resource group, a quantity of resource unit sets included in the third resource group is not less than a quantity of resource unit sets included in the fourth resource group; and the third resource group and the fourth resource group are any two of the K resource groups.

Optionally, before precoding, by using the N precoding matrices, the data sent in the N resource unit sets, the processor is further configured to divide a target resource group into j resource unit subsets, where the target resource group is a resource group whose quantity j of included resource unit sets is greater than or equal to 2 in the K resource groups, and each of j resource unit sets included in the target resource group is the same as each of the j resource unit subsets respectively.

Optionally, when the value of K is 1, before precoding, by using the N precoding matrices, the data sent in the N resource unit sets, the processor is further configured to group the K resource groups into N resource unit subsets, where each of the N resource unit sets is the same as each of the N resource unit subsets respectively.

Optionally, when the value of K is greater than the value of N, each of the N resource unit sets includes at least one of the K resource groups and different resource unit sets include different resource groups.

Optionally, the threshold M is preconfigured in the terminal or is obtained by the terminal based on indication information, and the indication information is carried in higher layer signaling or downlink control information DCI.

It should be noted that for implementation of the operations, reference may be made to corresponding descriptions in the method embodiment shown in FIG. 2.

According to the terminal 100 shown in FIG. 10, when the data sent in the S scheduled resource units needs to be precoded, first, the S resource units are grouped into the K resource groups based on intervals between the S resource units, so that resource units with a relatively large interval are grouped into different resource groups, and resource units with a relatively small interval are grouped into a same group. Then, a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio and improve encoding and decoding performance of a precoded data signal on a receive side. In addition, a precoding matrix used for sending data at a relatively large system bandwidth can be indicated by properly using a limited quantity of PMIs, and a relatively large system bandwidth can be indicated by using the limited quantity of PMIs.

Figure 11:
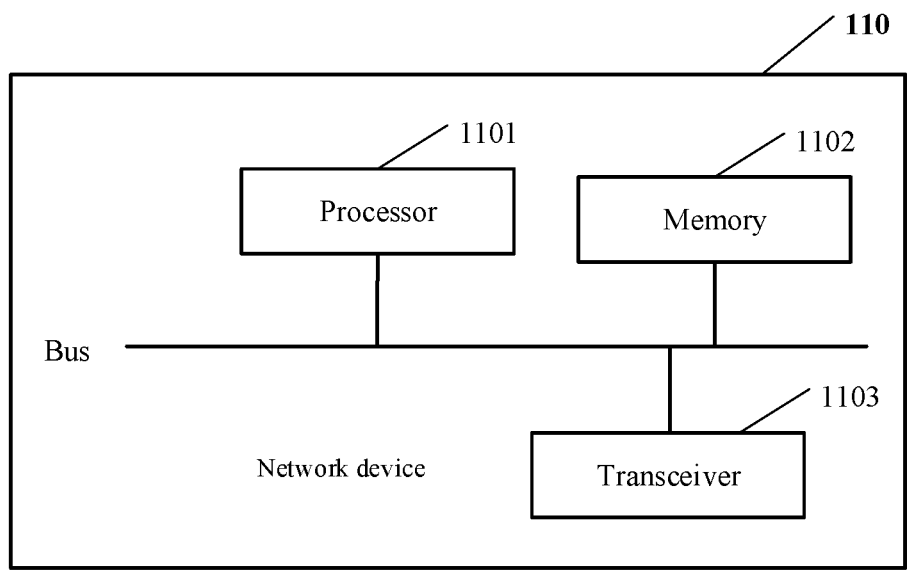
FIG. 11 is a schematic structural diagram of another network device according to an embodiment of the present disclosure.

FIG. 11 shows a network device 110 according to an embodiment of the present disclosure. The network device 110 includes a processor 1101, a memory 1102, and a transceiver 1103. The processor 1101, the memory 1102, and the transceiver 1103 connected to each other by using a bus.

The memory 1102 includes but is not limited to a random access memory (RAM), a read-only memory (ROM), an erasable programmable read only memory (EPROM), or a compact disc read-only memory (CD-ROM). The memory 1102 is configured to store a related instruction and related data. The transceiver 1103 is configured to receive and send data.

The processor 1101 may be one or more central processing units (CPU). When the processor 1101 is one CPU, the CPU may be a single-core CPU or a multi-core CPU.

The processor 1101 in the network device 110 is configured to read program code stored in the memory 1102, to perform the following operations:

grouping S scheduled resource units into K resource groups, where a quantity of resource units that separate any resource unit in a first resource group from any resource unit in a second resource group in the system bandwidth is not less than a threshold M, the first resource group and the second resource group are any two of the K resource groups, a quantity of resource units that separate a first resource unit from a second resource unit in the system bandwidth is less than the threshold M, the first resource unit and the second resource unit are two resource units in any one of the K resource groups, and in the system bandwidth, the first resource unit is a resource unit that is scheduled to the terminal preceding or following the second resource unit; sending resource unit allocation signaling by using the transceiver, where the resource unit allocation signaling is used to indicate the S scheduled resource units; and sending precoding indication information by using the transceiver, where the precoding indication information is used to indicate N precoding matrices that are used for sending data in N resource unit sets, resource units included in each of the N resource unit sets are determined based on the K resource groups, S, K, M, and N are all positive integers, and all resource units included in the N resource unit sets are the same as the S resource units.

According to the foregoing operations, when the data sent in the S scheduled resource units needs to be precoded, first, the S resource units are grouped into the K resource groups based on intervals between the S resource units, so that resource units with a relatively large interval are grouped into different resource groups, and resource units with a relatively small interval are grouped into a same group.

Then, a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio and improve encoding and decoding performance of a precoded data signal on a receive side. In addition, a precoding matrix used for sending data at a relatively large system bandwidth can be indicated by properly using a limited quantity of PMIs, and a relatively large system bandwidth can be indicated by using the limited quantity of PMIs.

Optionally, each of the N resource unit sets belongs to a first-type resource unit set or a second-type resource unit set, resource units included in any resource unit set belonging to the first-type resource unit set are the same as resource units included in at least one of the K resource groups, and resource units included in a plurality of resource unit sets in the second-type resource unit set belong to a same resource group of the K resource groups.

Optionally, when a value of K is not greater than a value of N and K is greater than 1, each of the K resource groups includes at least one of the N resource unit sets and different resource groups correspond to different resource unit sets; if a quantity of resource units included in a third resource group is greater than or equal to a quantity of resource units included in a fourth resource group, a quantity of resource unit sets included in the third resource group is not less than a quantity of resource unit sets included in the fourth resource group; and the third resource group and the fourth resource group are any two of the K resource groups.

Optionally, the processor is further configured to divide a target resource group into j resource unit subsets, where the target resource group is a resource group whose quantity j of included resource unit sets is greater than or equal to 2 in the K resource groups, and each of j resource unit sets included in the target resource group is the same as each of the j resource unit subsets respectively.

Optionally, when the value of K is 1, the processor is further configured to group the K resource groups into N resource unit subsets, where each of the N resource unit sets is the same as each of the N resource unit subsets respectively.

Optionally, when the value of K is greater than the value of N, each of the N resource unit sets includes at least one of the K resource groups and different resource unit sets include different resource groups.

Optionally, the threshold M is preconfigured in the terminal or is obtained by the terminal based on indication information, and the indication information is carried in higher layer signaling or downlink control information DCI.

It should be noted that for implementation of the operations, reference may be made to corresponding descriptions in the method embodiment shown in FIG. 2.

According to the network device 110 shown in FIG. 11, when the data sent in the S scheduled resource units needs to be precoded, first, the S resource units are grouped into the K resource groups based on intervals between the S resource units, so that resource units with a relatively large interval are grouped into different resource groups, and resource units with a relatively small interval are grouped into a same group. Then, a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio and improve encoding and decoding performance of a precoded data signal on a receive side. In addition, a precoding matrix used for sending data at a relatively large system bandwidth can be indicated by properly using a limited quantity of PMIs, and a relatively large system bandwidth can be indicated by using the limited quantity of PMIs.

In conclusion, according to the embodiments of the present disclosure, when the data sent in the S scheduled resource units needs to be precoded, first, the S resource units are grouped into the K resource groups based on intervals between the S resource units, so that resource units with a relatively large interval are grouped into different resource groups, and resource units with a relatively small interval are grouped into a same group. Then, a precoding scheme for data sent in a resource unit in each resource group is determined based on the K resource groups, so that data sent in some resource units with a relatively small interval can be encoded by using a same precoding scheme whenever possible. Because data transmitted in the some resource units with a relatively small interval is usually highly correlated, using the same precoding scheme for data with relatively high correlation can increase a signal-to-noise ratio and improve encoding and decoding performance of a precoded data signal on a receive side. In addition, a precoding matrix used for sending data at a relatively large system bandwidth can be indicated by properly using a limited quantity of PMIs, and a relatively large system bandwidth can be indicated by using the limited quantity of PMIs.

A person of ordinary skill in the art may understand that all or some of the processes of the methods in the embodiments may be implemented by a computer program instructing relevant hardware. The program may be stored in a computer-readable storage medium. When the program is run, the processes of the methods in the embodiments are performed. The foregoing storage medium includes any medium that can store program code, for example, a ROM, a random access memory RAM, a magnetic disk, or an optical disk.

What is claimed is:

1. A method, comprising:
   determining, by a terminal based on resource unit allocation signaling, locations of S resource units in a system bandwidth that are scheduled to the terminal;
   grouping, by the terminal, the S resource units into K resource groups, wherein a quantity of resource units that separate any resource unit in a first resource group from any resource unit in a second resource group in the system bandwidth is not less than a threshold M, the first resource group and the second resource group are any two of the K resource groups, a quantity of resource units that separate a first resource unit from a second resource unit in the system bandwidth is less than the threshold M, the first resource unit and the second resource unit are two resource units in a single resource group of the K resource groups, and in the system bandwidth, the first resource unit is a resource unit that is scheduled to the terminal preceding the second resource unit;
   dividing a target resource group into j resource unit subsets, wherein the target resource group is a resource group in the K resource groups whose quantity of comprised resource unit sets is greater than or equal to 2, and each of the comprised resource unit sets in the target resource group is the same as each of the j resource unit subsets, respectively; and precoding, by the terminal by using N precoding matrices, data sent in N resource unit sets, wherein each of the N resource unit sets comprises a number of resource units that are determined based on the K resource groups, and S, K, and M are all positive integers greater than or equal to one.

2. The method according to claim 1, wherein each of the N resource unit sets belongs to a first-type resource unit set or a second-type resource unit set, resource units comprised in any resource unit set belonging to the first-type resource unit set are the same as resource units comprised in at least one of the K resource groups, and resource units comprised in a plurality of resource unit sets in the second-type resource unit set belong to a same resource group of the K resource groups.

3. The method according to claim 1, wherein when a value of K is not greater than a value of N and K is greater than 1, each of the K resource groups comprises at least one of the N resource unit sets and different resource groups correspond to different resource unit sets; if a quantity of resource units comprised in a third resource group is greater than or equal to a quantity of resource units comprised in a fourth resource group, a quantity of resource unit sets comprised in the third resource group is not less than a quantity of resource unit sets comprised in the fourth resource group; and the third resource group and the fourth resource group are any two of the K resource groups.

4. The method according to claim 1, wherein when the value of K is 1, before the precoding, by the terminal by using N precoding matrices, data sent in N resource unit sets, the method further comprises:

grouping the K resource groups into N resource unit subsets, wherein each of the N resource unit sets is the same as each of the N resource unit subsets, respectively.

5. The method according to claim 1, wherein when the value of K is greater than the value of N, each of the N resource unit sets comprises at least one of the K resource groups and different resource unit sets comprise different resource groups.

6. The method according to claim 1, wherein the threshold M is preconfigured in the terminal or is obtained by the terminal based on indication information, and the indication information is carried in higher layer signaling or downlink control information (DCI).

7. A method, comprising:

grouping, by a network device, S scheduled resource units into K resource groups, wherein a quantity of resource units that separate any resource unit in a first resource group from any resource unit in a second resource group in the system bandwidth is not less than a threshold M, the first resource group and the second resource group are any two of the K resource groups, a quantity of resource units that separate a first resource unit from a second resource unit in the system bandwidth is less than the threshold M, the first resource unit and the second resource unit are two resource units in a single resource group of the K resource groups, and in the system bandwidth, the first resource unit is a resource unit that is scheduled to a terminal preceding the second resource unit;

sending, by the network device, resource unit allocation signaling, wherein the resource unit allocation signaling is used to indicate the S scheduled resource units;

dividing a target resource group into j resource unit subsets, wherein the target resource group is a resource group in the K resource groups whose quantity of comprised resource unit sets is greater than or equal to 2, and each of j resource unit sets comprised in the target resource group is the same as each of the j resource unit subsets, respectively; and sending, by the network device, precoding indication information, wherein the precoding indication information is used to indicate N precoding matrices that are used for sending data in N resource unit sets, and each of the N resource unit sets comprises a number of resource units that are determined based on the K resource groups, and S, K, M, and N are all positive integers.

8. The method according to claim 7, wherein each of the N resource unit sets belongs to a first-type resource unit set or a second-type resource unit set, resource units comprised in any resource unit set belonging to the first-type resource unit set are the same as resource units comprised in at least one of the K resource groups, and resource units comprised in a plurality of resource unit sets in the second-type resource unit set belong to a same resource group of the K resource groups.

9. The method according to claim 7, wherein when a value of K is not greater than a value of N and K is greater than 1, each of the K resource groups comprises at least one of the N resource unit sets and different resource groups correspond to different resource unit sets; if a quantity of resource units comprised in a third resource group is greater than or equal to a quantity of resource units comprised in a fourth resource group, a quantity of resource unit sets comprised in the third resource group is not less than a quantity of resource unit sets comprised in the fourth resource group; and the third resource group and the fourth resource group are any two of the K resource groups.

10. The method according to claim 7, wherein when the value of K is 1, the method further comprises:

grouping the K resource groups into N resource unit subsets, wherein each of the N resource unit sets is the same as each of the N resource unit subsets, respectively.

11. The method according to claim 7, wherein when the value of K is greater than the value of N, each of the N resource unit sets comprises at least one of the K resource groups and different resource unit sets comprise different resource groups.

12. The method according to claim 7, wherein the threshold M is preconfigured in the terminal or is obtained by the terminal based on indication information, and the indication information is carried in higher layer signaling or downlink control information (DCI).

13. A terminal, wherein the terminal comprises at least one processor and a memory, the memory is configured to store a program, and the at least one processor invokes the program in the memory to perform the following operations:

determining, based on resource unit allocation signaling, locations of S resource units in a system bandwidth that are scheduled to the terminal;

grouping the S resource units into K resource groups, wherein a quantity of resource units that separate any resource unit in a first resource group from any resource unit in a second resource group in the system bandwidth is not less than a threshold M, the first resource group and the second resource group are any two of the K resource groups, a quantity of resource units that separate a first resource unit from a second resource unit in the system bandwidth is less than the threshold M, the first resource unit and the second resource unit are two resource units in a single resource group of the K resource groups, and in the system bandwidth, the first resource unit is a resource unit that is scheduled to the terminal preceding the second resource unit;

divide a target resource group into j resource unit subsets, wherein the target resource group is a resource group whose quantity of comprised resource unit sets is greater than or equal to 2 in the K resource groups, and each of j resource unit sets comprised in the target resource group is the same as each of the j resource unit subsets, respectively; and precoding, by using N precoding matrices, data sent in N resource unit sets, wherein each of the N resource unit sets comprises a number of resource units that are determined based on the K resource groups, and S, K, and M are all positive integers.

14. The terminal according to claim 13, wherein each of the N resource unit sets belongs to a first-type resource unit set or a second-type resource unit set, resource units comprised in any resource unit set belonging to the first-type resource unit set are the same as resource units comprised in at least one of the K resource groups, and resource units comprised in a plurality of resource unit sets in the second-type resource unit set belong to a same resource group of the K resource groups.

15. The terminal according to claim 13, wherein when a value of K is not greater than a value of N and K is greater than 1, each of the K resource groups comprises at least one of the N resource unit sets and different resource groups correspond to different resource unit sets; if a quantity of resource units comprised in a third resource group is greater than or equal to a quantity of resource units comprised in a fourth resource group, a quantity of resource unit sets comprised in the third resource group is not less than a quantity of resource unit sets comprised in the fourth resource group; and the third resource group and the fourth resource group are any two of the K resource groups.

16. The terminal according to claim 13, wherein when the value of K is 1, before precoding, by using the N precoding matrices, the data sent in the N resource unit sets, the processor is further configured to:

group the K resource groups into N resource unit subsets, wherein each of the N resource unit sets is the same as each of the N resource unit subsets respectively.

17. The terminal according to claim 13, wherein when the value of K is greater than the value of N, each of the N resource unit sets comprises at least one of the K resource groups and different resource unit sets comprise different resource groups.

* * * * *